(12) United States Patent
Marrinan et al.

(10) Patent No.: US 8,695,958 B2
(45) Date of Patent: Apr. 15, 2014

(54) FLEXIBLE FIXTURE

(75) Inventors: Thomas E. Marrinan, Minneapolis, MN (US); Côme René-Bazin De Jouy, Minneapolis, MN (US)

(73) Assignee: PaR Systems, Inc., Shoreview, MN (US)

( * ) Notice: Subject to any disclaimer, the term of this patent is extended or adjusted under 35 U.S.C. 154(b) by 615 days.

(21) Appl. No.: 12/852,357

(22) Filed: Aug. 6, 2010

(65) Prior Publication Data

US 2011/0037213 A1 Feb. 17, 2011

Related U.S. Application Data

(60) Provisional application No. 61/231,828, filed on Aug. 6, 2009, provisional application No. 61/249,589, filed on Oct. 7, 2009.

(51) Int. Cl.
*B23Q 3/00* (2006.01)
(52) U.S. Cl.
USPC .............................. 269/315; 29/468
(58) Field of Classification Search
USPC .................. 269/315, 21, 20, 289 R
See application file for complete search history.

(56) References Cited

U.S. PATENT DOCUMENTS

| | | |
|---|---|---|
| 2,471,921 A | 5/1949 | Ashdown |
| 3,542,354 A | 11/1970 | Fitzpatrick |
| 3,853,313 A | 12/1974 | Appenzeller et al. |
| 3,926,447 A | 12/1975 | Cox, Jr. |
| 4,080,716 A | 3/1978 | Vom Dorp |
| 4,088,312 A | 5/1978 | Frosch et al. |
| 4,317,577 A | 3/1982 | Cameron |
| 4,432,559 A | 2/1984 | Rasmussen |
| 4,527,783 A | 7/1985 | Collora et al. |
| 4,638,984 A | 1/1987 | Puisais et al. |
| 4,684,113 A | 8/1987 | Douglas et al. |
| 4,736,957 A | 4/1988 | Bischopink |
| 5,163,793 A | 11/1992 | Martinez |
| 5,230,594 A | 7/1993 | Pilkington |
| 5,364,083 A | 11/1994 | Ross et al. |
| 5,372,357 A | 12/1994 | Blaimschein |
| 5,395,098 A | 3/1995 | Eickhorst et al. |
| 5,427,363 A | 6/1995 | Rink et al. |
| 5,457,868 A | 10/1995 | Blaimschein |

(Continued)

FOREIGN PATENT DOCUMENTS

EP 1728594 A2 12/2006

OTHER PUBLICATIONS

European Search Report of the European Patent Office Patent Office in counterpart foreign application No. PCT/US2010/044770 filed Aug. 6, 2010.

(Continued)

*Primary Examiner* — Lee D Wilson
*Assistant Examiner* — Nirvana Deonauth
(74) *Attorney, Agent, or Firm* — Steven M. Koehler; Westman, Champlin & Koehler, P.A.

(57) ABSTRACT

A system and method for supporting a workpiece includes a plurality of support assemblies with movable heads. Positional errors are ascertained for the heads based on different positions thereof and used to properly position the heads to support the workpiece. Other inventive aspects are directed to features of the support assemblies and heads thereof.

23 Claims, 21 Drawing Sheets

(56) References Cited

U.S. PATENT DOCUMENTS

| | | | |
|---|---|---|---|
| 5,546,784 | A | 8/1996 | Haas et al. |
| 5,551,677 | A | 9/1996 | Puettmer et al. |
| 5,562,276 | A | 10/1996 | Blick |
| 5,590,870 | A | 1/1997 | Goellner |
| 5,653,005 | A * | 8/1997 | Speller et al. ............. 29/701 |
| 5,722,646 | A | 3/1998 | Soderberg et al. |
| 6,012,711 | A | 1/2000 | Cipolla |
| 6,121,781 | A | 9/2000 | Martinez |
| 6,209,188 | B1 | 4/2001 | Soderberg et al. |
| 6,250,619 | B1 | 6/2001 | Cook et al. |
| 6,454,333 | B2 | 9/2002 | Portal |
| 6,575,443 | B2 | 6/2003 | Kick |
| 6,578,399 | B1 | 6/2003 | Haas et al. |
| 6,873,880 | B2 * | 3/2005 | Hooke et al. ............. 700/159 |
| 7,444,742 | B2 | 11/2008 | Sturm, Jr. et al. |
| 2004/0093731 | A1 | 5/2004 | Sarh |
| 2005/0015962 | A1 * | 1/2005 | Sturm et al. ............. 29/468 |
| 2006/0267262 | A1 * | 11/2006 | Schiavi et al. ............. 269/21 |
| 2009/0283949 | A1 * | 11/2009 | Brown et al. ............. 269/58 |

OTHER PUBLICATIONS

Official Search Report of the European Patent Office in counterpart foreign application No. PCT/US2010/04470 filed Aug. 6, 2010.

Written Opinion of the European Patent Office in counterpart foreign application No. PCT/US2010/04470 filed Aug. 6, 2010.

Official Search Report of the European Patent Office in counterpart foreign application No. 04755376.3 filed Jun. 17, 2004.

Modig UHF Skin brochure, 3 pages, date unknown.

* cited by examiner

FLEXIBLE FIXTURE

CROSS-REFERENCE TO RELATED APPLICATIONS

The present application claims the benefit of U.S. Provisional Patent Application Ser. No. 61/231,828, filed Aug. 6, 2009, and U.S. Provisional Patent Application Ser. No. 61/249,589, filed Oct. 7, 2009, both of which are hereby incorporated reference in their entirety.

BACKGROUND

The discussion below is merely provided for general background information and is not intended to be used as an aid in determining the scope of the claimed subject matter.

Holding fixtures for three dimensional workpieces are available from Modig Machine AB of Virserum, Sweden and CNA Manufacturing Systems, Inc. of Woodinville, Wash. These fixtures hold workpieces in a fixed position through an array of posts. Each of the posts are equipped with a flexible vacuum cup that when seated upon a portion of the surface of the workpiece forms a vacuum. When a vacuum is pulled in each of the posts, the workpiece is held securely. The posts are arranged in a grid pattern, oriented vertically, such that when the vacuum cups are in a home or resting position each of the vacuum cups lay in a common plane. In order to hold a three dimensional part, each of the posts are adjusted vertically so as to conform the posts taken as a whole to the outer surface of the workpiece to be held. In the Modig System, a large setting machine is provided to adjust the posts. In particular, a gantry setting machine includes two guide rails positioned along opposite sides of the grid of posts and a bridge spanning between the guide rails carries a plurality of setting fixtures used to set the vertical height of each of the posts. As indicated above, the posts are arranged in a grid pattern of equally spaced rows and columns. The setting device, disposed on the bridge, conforms to the row spacing of the posts in the grid. As the bridge moves along the guide rails, the height of each of the setting devices on the bridge is adjusted such that when the corresponding post, located below each setting device, is actuated the post extends upwardly until the desired height of the vacuum cup is obtained. The bridge is moved along the grid on a column-by-column basis setting each column of posts of the grid in this manner. The grid pattern of the posts and the setting bridge may limit the extent of curvature that the workpieces can have.

Another known fixture described in U.S. Pat. No. 7,444,742. The fixture includes a plurality of support assemblies. Each support assembly includes a linear actuator with an end adapted to support a workpiece, or a portion thereof. Each end includes a moveable coupling adapted to hold the workpiece engaging end in a selected orientation. A positioning device is moveable to a position proximate each end of each support assembly, for example, by a robotic arm or other positioning assembly. An end of the positioning device is configured to operate each movable coupling so as to obtain the selected orientation of each end of each support assembly.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

In one embodiment, a holding assembly includes a plurality of support assemblies. Each support assembly has a head adapted to support a workpiece, where each head includes a guided member having a contact surface configured to contact the workpiece and a guide assembly configured to guide the guided member about an axis that coincides with the contact surface.

In another embodiment, each support assembly includes a support rod arranged to maintain the corresponding head in a selected position. The support rods of at least some of the support assemblies can be fixedly coupled to each respective head to move therewith.

If desired, each support assembly can include complementary engaging surfaces configured to rotate the support rod to a selected position as the engaging surfaces slide relative to each other. In one embodiment, the engaging surfaces include a first engaging surface fixedly attached to the support rod to move therewith and a second engaging surface held in a stationary position. For example, the first engaging surface can be formed on a collar encircling the support rod.

In another embodiment, each support assembly includes a coupling assembly having a sliding member slidable on the support rod and selectively fixed to the support rod. If desired, at least one of the coupling assemblies can include a link pivotally connecting the head to the sliding member. In yet another embodiment, the at least one of the coupling assemblies can include a second sliding member slidable on the support rod and selectively fixed to the support rod, where the head is pivotally connected to the second sliding member with the second link.

In yet another embodiment, the sliding member can comprise a brake having an expandable body encircling the support rod and selectively expanded to provide a force to secure the brake and support rod relative to each other. The brake can include a gripping sleeve encircling the support rod, where the expandable body encircles the gripping sleeve. First and second support blocks can engage opposite ends of the gripping sleeve.

In another embodiment a holding assembly includes a plurality of support assemblies, where each support assembly has a head adapted to support a workpiece, a support rod fixedly coupled to the head to move therewith, and complementary engaging surfaces configured to rotate the support rod to a selected position as the engaging surfaces slide relative to each other. If desired, the engaging surfaces can comprise a first engaging surface fixedly attached to the support rod to move therewith and a second engaging surface held in a stationary position. For example, the first engaging surface can be formed on a collar encircling the support rod.

In yet another embodiment, a holding assembly includes a plurality of support assemblies, where each support assembly has a head adapted to support a workpiece, a support rod arranged to maintain the corresponding head in a selected position, and a brake slidable on the support rod and selectively fixed to the support rod. The brake has an expandable body encircling the support rod that can be selectively expanded to provide a force to secure the brake and support rod relative to each other. If desired, the brake can include a gripping sleeve encircling the support rod, where the expandable body encircles the gripping sleeve. First and second support blocks can engage opposite ends of the gripping sleeve.

Another embodiment is a system for supporting a workpiece. The system includes a holding assembly comprising a plurality of support assemblies, each support assembly comprising a head adapted to support a portion of the workpiece, each head being movable from a reference position to a position remote from the reference position. A controller is provided and configured to access a model of the holding assembly having at least some of the support assemblies and a model of the workpiece to be supported by the holding assembly, wherein the controller is configured ascertain a position of each head of each of said at least some of the support assemblies based on the model of the holding assembly and the model of the workpiece to be supported, the controller configured to provide output signals related to desired positions of the head.

In yet another embodiment, a method for configuring a holding assembly comprising a plurality of support assemblies to support a workpiece is provided, where each support assembly comprising a head adapted to support a portion of the workpiece. The method includes ascertaining the position of each head with a controller based on a virtual model of the holding assembly and a virtual model of the workpiece to be supported; and adjusting the position of each head based on the corresponding ascertained position.

In yet another embodiment, a system for supporting a workpiece is provided. The system includes a holding assembly having a plurality of support assemblies. Each support assembly includes a head adapted to support a portion of the workpiece and where each head is movable from a reference position to a position remote from the reference position. A controller is configured to ascertain a positional error associated with each support assembly, the positional error being ascertained from the reference position and the position remote from the reference position. The controller is further configured to use the positional error to adjust a position of each respective head in order to support the portion of the workpiece.

In yet another embodiment, a method is provided for configuring a holding assembly comprising a plurality of support assemblies to support a workpiece, each support assembly comprising a head adapted to support a portion of the workpiece. The method includes obtaining a reference position for each head; obtaining a position remote from the reference position for each head; ascertaining a positional error associated with each support assembly with a controller, the positional error being ascertained from the reference position and the position remote from the reference position; and using the corresponding positional error to adjust a position of each head in order to support the portion of the workpiece.

The foregoing system and method can have one or more of the following features. Each support assembly can include a support rod arranged to provide support for each corresponding head. The heads can be configured to tilt with respect to a longitudinal axis of each respective support rod, and where the controller is configured to use the positional error to adjust a tilt of the respective head with respect to the longitudinal axis of the corresponding support rod. The heads can be configured to rotate with respect to a longitudinal axis of the corresponding support rod, and wherein the controller is configured to use the positional error to adjust the rotation of each head with respect to the longitudinal axis of the corresponding support rod.

The controller can be configured to access a model of the holding assembly having at least some of the support assemblies and a model of the workpiece to be supported by the holding assembly, where the controller is further configured ascertain a position of each head of each of said at least some of the support assemblies based on the model of the holding assembly and the model of the workpiece to be supported.

The controller can be configured to ascertain a vector that is normal to an outer surface of the workpiece for each support assembly based on the corresponding positional error. The controller can be configured to use a positioning system to ascertain the reference position and the position remote from the reference position for each corresponding support assembly.

A positioning system can be included and adapted to engage each of the support assemblies to move each corresponding head. The positioning system is coupled to the controller to receive command signals from controller to selectively move each head of each support assembly in multiple degrees of freedom depending on that provided by the support assembly. It should be noted that at least with respect to the embodiments described above that use a virtual model of the holding assembly and the workpiece to ascertain the positions of the heads, the form of support assemblies need not be limited to that shown and described herein. For instance, the support assemblies can have one or more actuators to move the support assembly in one or more degrees of freedom. The positioning assembly can also have an aligning fixture to engage the support assembly, where the aligning fixture can take a number of forms. For instance, by way of example, the support assemblies and aligning fixture described in U.S. Pat. No. 7,444,742 (which is hereby incorporated by reference in its entirety) can be used.

DETAILED DESCRIPTION OF ILLUSTRATIVE EMBODIMENTS

Figure 1:
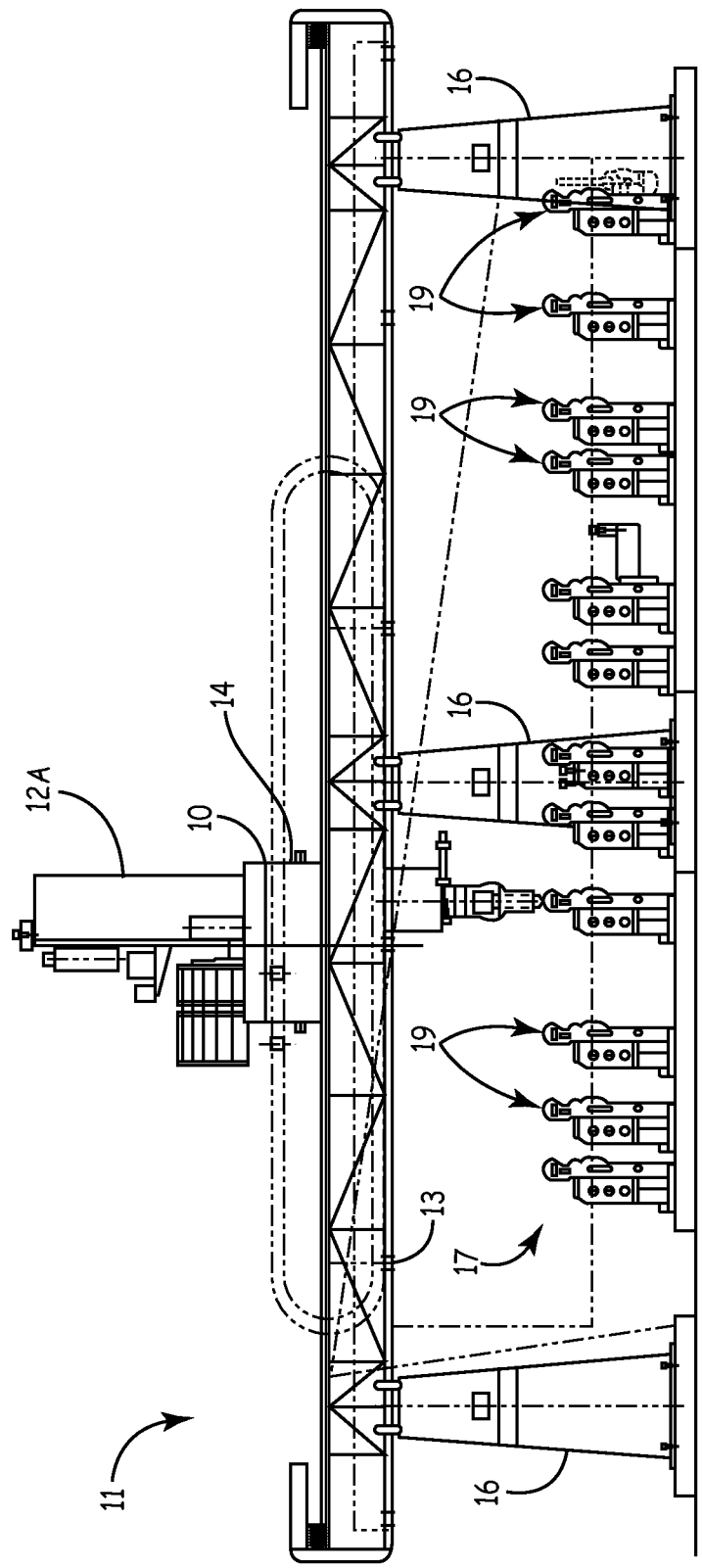
FIG. 1 is a side elevational view of a flexible fixture.
Figure 2:
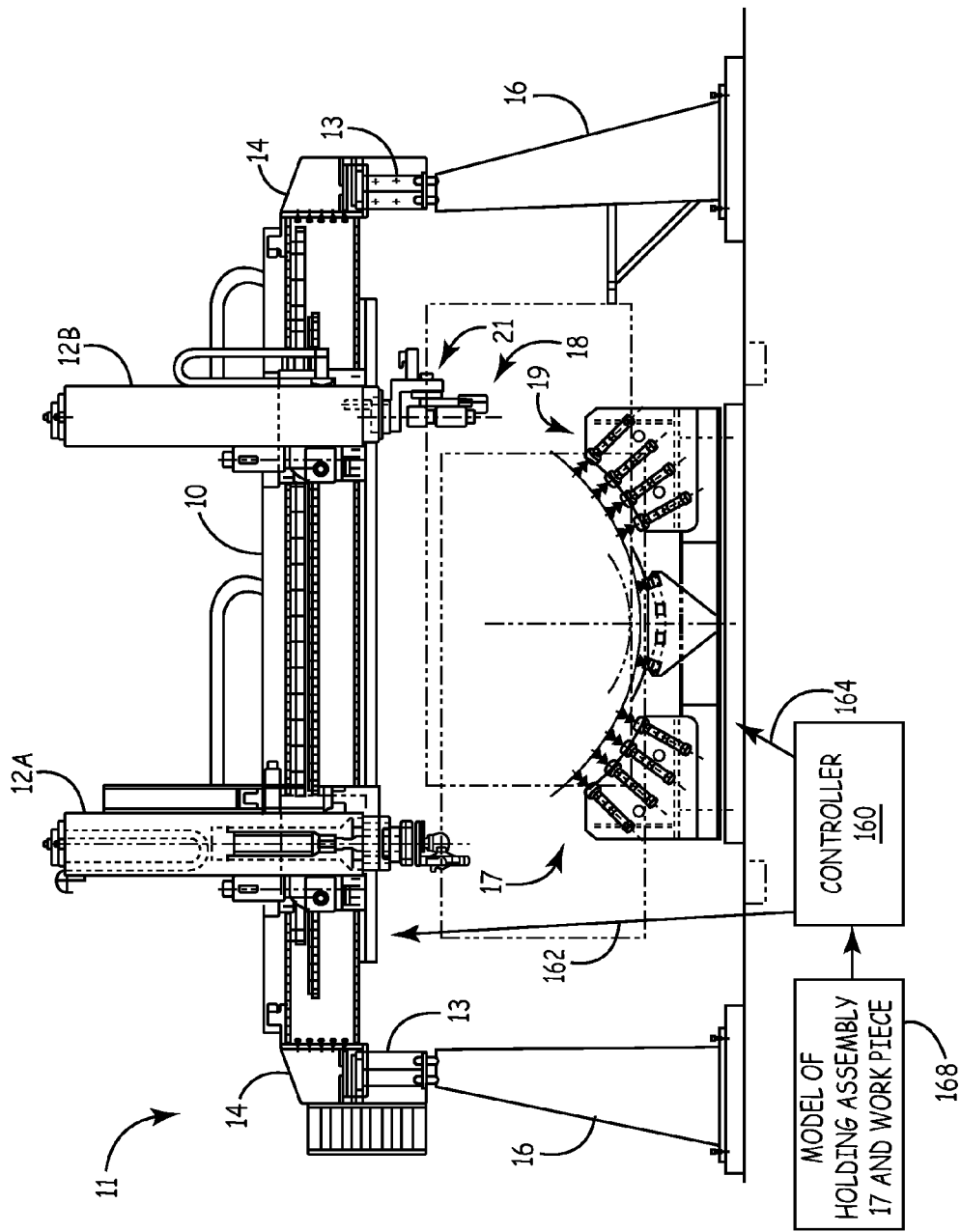
FIG. 2 is a front elevational view of the flexible fixture.
Figure 18:
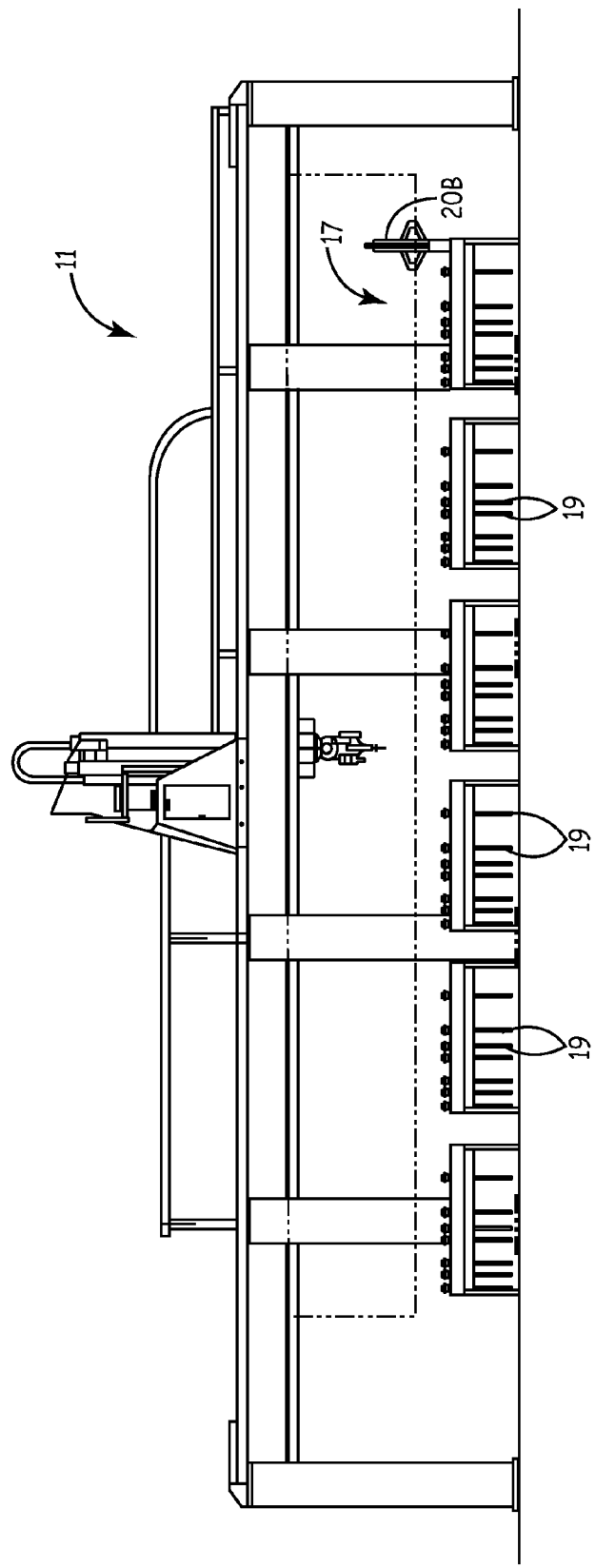
FIG. 18 is a side elevational view of second holding assembly.
Figure 19:
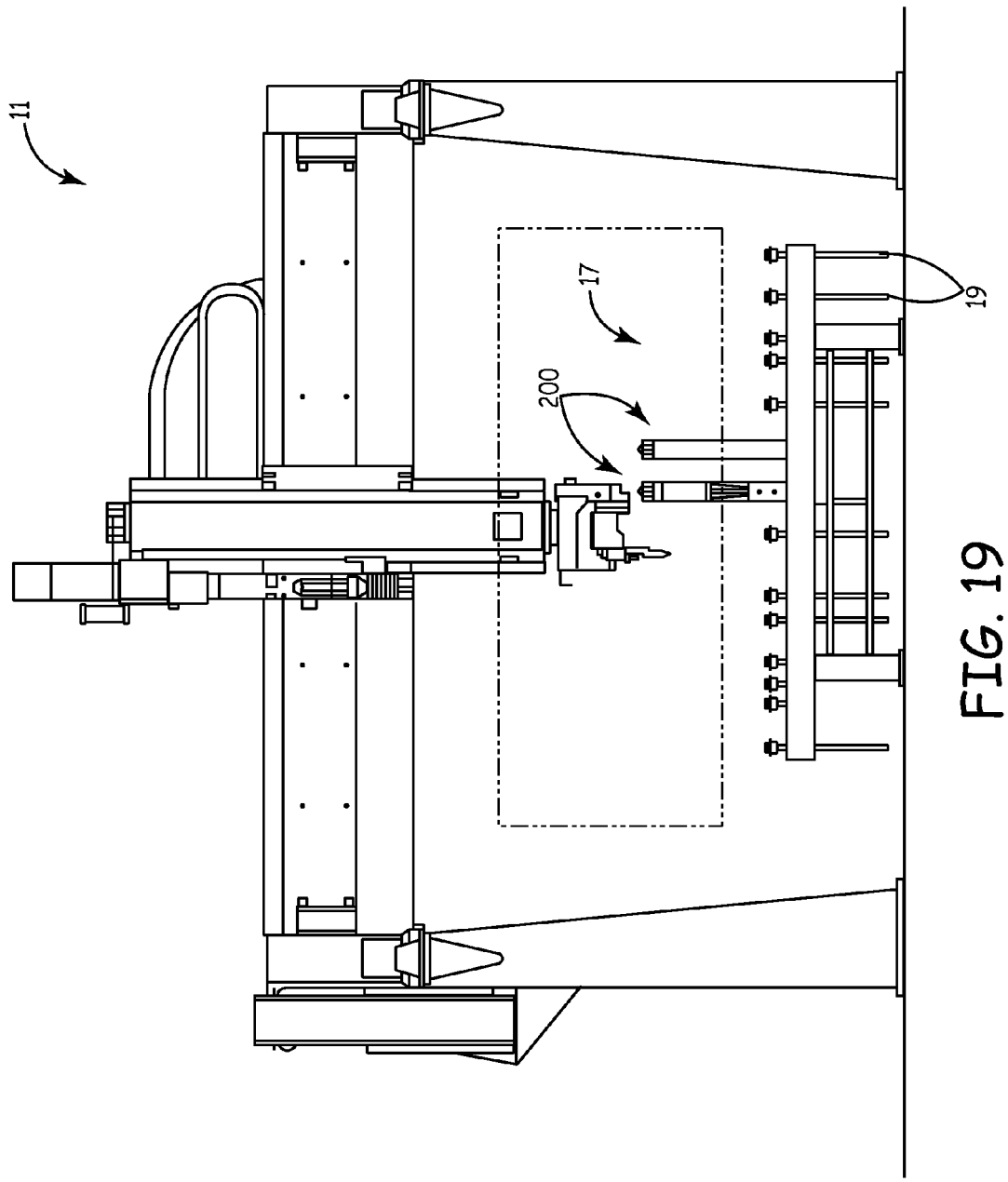
FIG. 19 is a front elevational view of the second holding assembly.

Referring to FIGS. 1-2, a gantry or positioning system is illustrated at 11. The gantry system 11 includes a pair of space-apart rails 13. In the exemplary embodiment, rails 13 are elevated, being supported by supports 16. A bridge 10 spans between rails 13. Two trucks 14 are coupled to bridge 10 and coupled to rails 13 in order to provide horizontal movement of bridge 10 in a direction parallel to the guide rails 13. Bridge 10 supports at least one mast 12A and 12B. In the embodiment illustrated, mast 12A is adapted to hold an end effector such as a laser for performing work on a workpiece supported by a holding assembly 17. If desired, mast 12B is also adapted to hold an end effector, which can include for example, a drill for performing work on the workpiece, but as further explained below, can also hold an aligning fixture 18 (FIGS. 11-13), described below, used to position and/or orient each of a plurality of support assemblies 19 comprising the holding assembly 17. The support assemblies 19 can be mounted at different heights as illustrated in FIGS. 1 and 2 or on a holding assembly that comprises a flat support structure (FIGS. 18 and 19). In a further embodiment, each support assembly 19 can be mounted at one of a plurality of selected locations on the support structure/holding assembly 17.

In the embodiment illustrated, mast 12B comprises a telescoping assembly in order to allow an end effector 21 attached to an end thereof to move in a vertical direction wherein movement of the mast 12B along the bridge 10 and movement of the bridge 10 along the guide rails 13 are orthogonal to the vertical direction of the mast 12B, thereby providing three-dimensional movement of the end effector 21. Rotational movements of the end effector 21 can provide at least two additional degrees of freedom. In this embodiment, the guide rails 13, trucks 14, mast 12B, bridge 10 and end effector 21 thereby provide five degrees of positioning movement. It should be understood that this is but one form of a positioning or robotic device to provide such movement wherein other robotic devices can be used to achieve desired positioning of an aligning fixture, which in this exemplary embodiment can be selectively coupled to the end effector 21 or a support therefor.

In the embodiment illustrated in FIG. 2, the, holding assembly 17 typically comprises a plurality of support assemblies 19 (each of which is configured to engage a portion of a workpiece (not illustrated). In general, as an aspect of the invention, the holding assembly 17 includes a plurality of support assemblies 19. Each support assembly 19 includes a head or end 22 for engaging and supporting a workpiece. In one embodiment, the head 22 includes a vacuum cup assembly 23, although it should be understood other heads having other devices (such as but not limited to protrusions, apertures, clamps and/or magnets) to engage and hold the workpiece can be used if desired.

Figure 3:
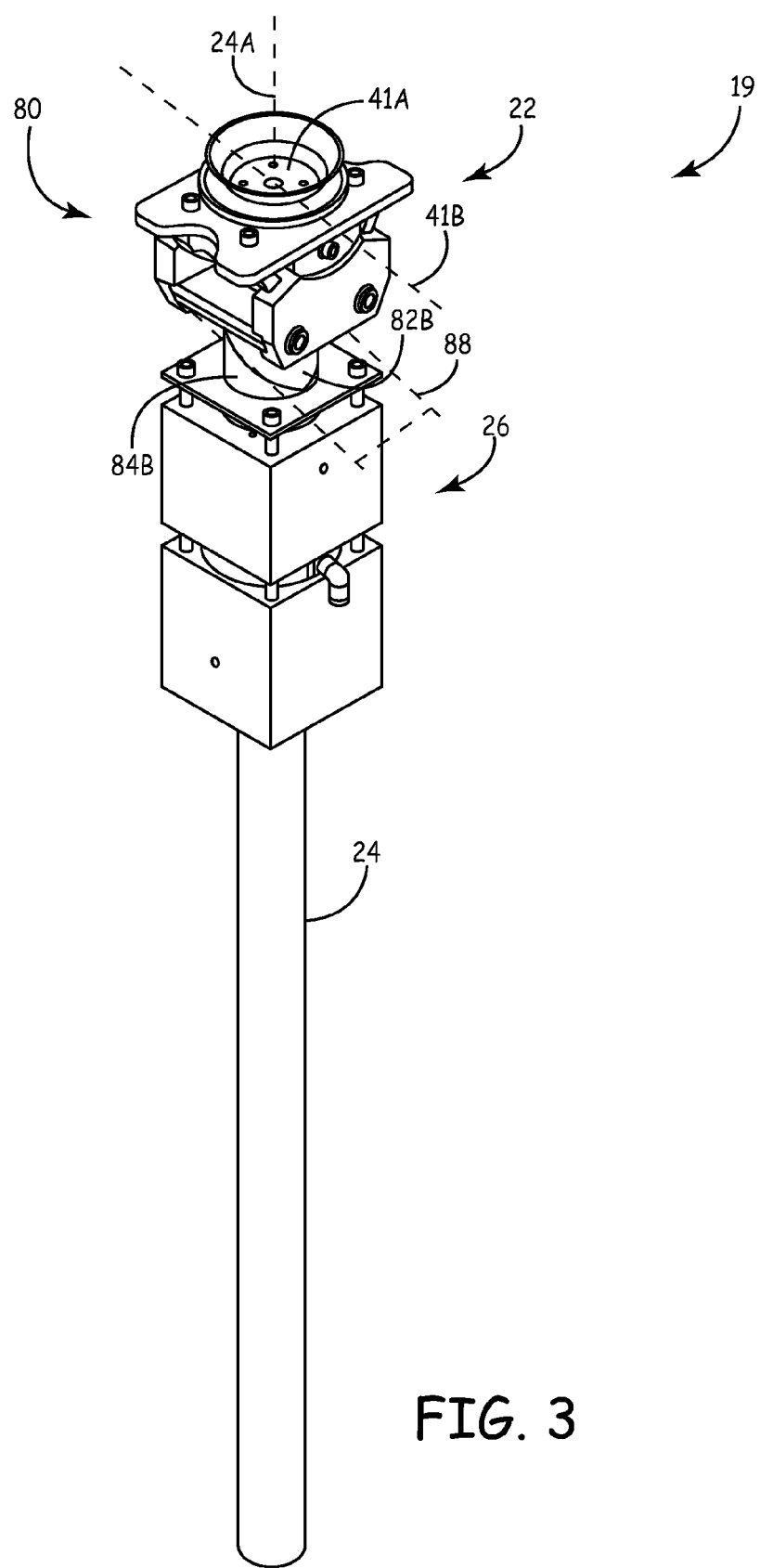
FIG. 3 is a perspective view of a first embodiment of a support assembly.
Figure 4:
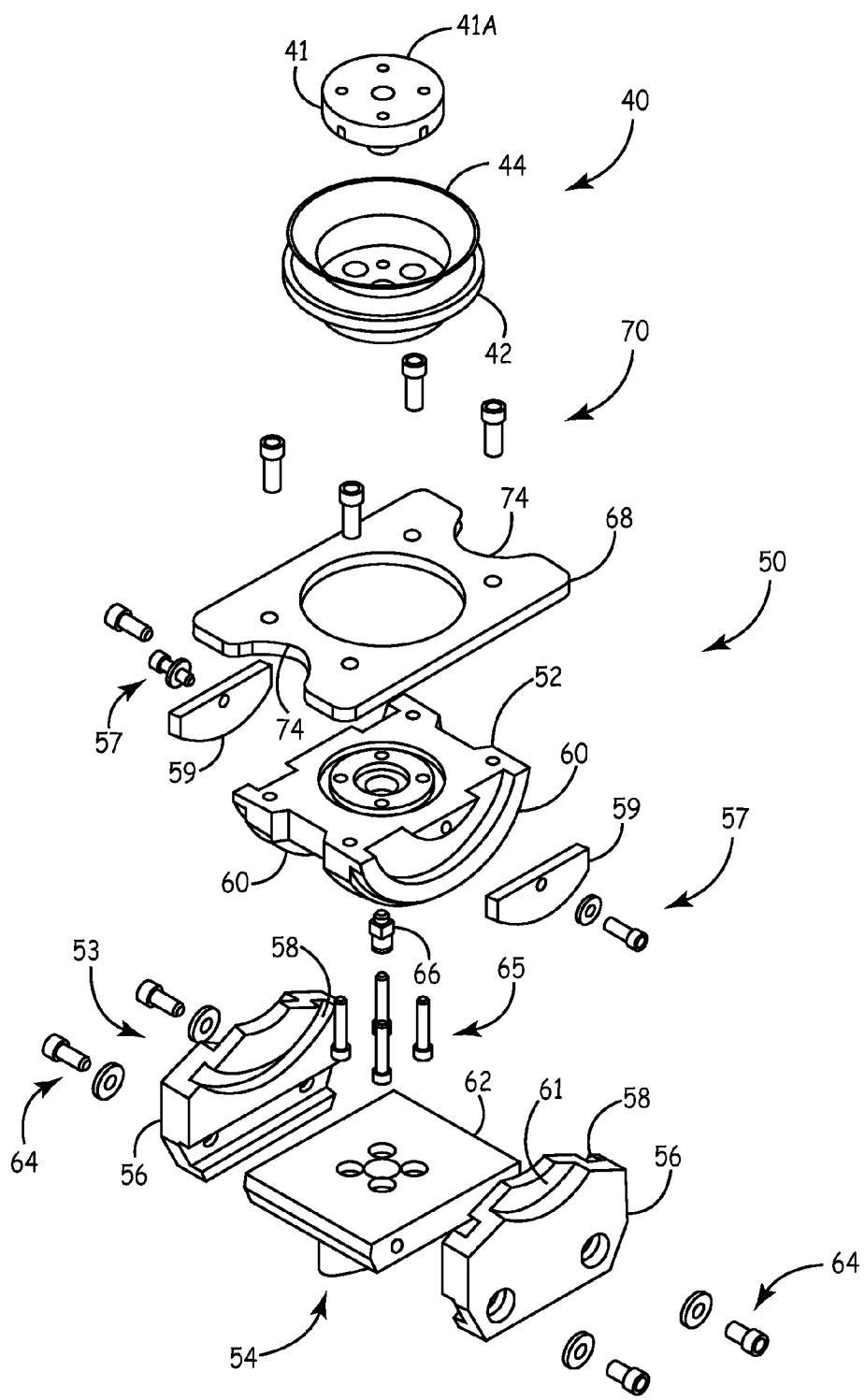
FIG. 4 is an exploded view of a head of a support assembly.

Referring to FIG. 3, the end of the support assembly 19 engageable with the workpiece is connected to a rod 24 that is movable, for example, slidable, with respect to a brake assembly 26 that selectively engages the rod 24 and holds it in a fixed position when desired. The aligning assembly or fixture 18 is selectively coupled to the end effector 21 (or the support therefor) and engages or is selectively coupled to the head or end 22 of the support assembly 19. One or more elements of the positioning system provided, herein by example system 11, such as but not limited to the end effector 21, if present, the assembly on the end of the mast 12A used to position the end effector 21, the mast 12A and/or any other part of the positioning system 11, are used to manipulate (pull, push, lift, pivot, etc.) head 22 of the support assembly 19 in multiple degrees of freedom (commonly 2 or more degrees of freedom depending on the degrees of freedom provided by the support assembly) to obtain the desired position of the head 22, typically 3-dimensional space, such that the head 22 is in proper position to receive a portion of the workpiece. Although in this embodiment, The support assembly 19 and portions thereof are illustrated in FIGS. 3-6. Referring first to FIG. 3, head 22 includes a device 40 for engaging the workpiece herein exemplified as the vacuum cup assembly 23 comprising a support block 41 and a flexible cup member 42 surrounding the support block 41. The cup member 42 includes a rim 44 that can sealingly engage the workpiece to hold the head 22 in a fixed position thereon.

A pivoting assembly 50 supports the vacuum cup assembly 23 and allows it to be pivoted to a selected position respect to a longitudinal axis of the rod 24. The pivoting assembly 50 includes a guided member 52 guided with respect to a fixed support 54. In particular, the guided member 52 and the support 54 include complimentary engaging surfaces so as to allow the guided member 52 to pivot or rotate about a fixed axis in an accurate manner. In the embodiment illustrated, the support 54 includes one or more support brackets 56. The guided member 52 is disposed between the support brackets 56 and is movably guided thereon with a guide assembly 53. In the embodiment illustrated, the guide assembly 53 includes a channel 58 on each support bracket 56 adapted to receive arcuate projection 60 formed on opposite sides of the guided member 52. As appreciated by those skilled in that art, other guide assemblies having cooperating guide components can be used, such as but not limited to where the guided member 52 includes a guide channel and the support member 54 (such as support brackets 56) include projection(s) configured to be guided in the guide channel.

In the embodiment illustrated, the guided member 52 is disposed between the brackets 56 such that the projections 60 engage each respective channel 58. Fasteners 57 and securing plates 59 secure the brackets 56 to the guided member 52 allowing sliding movement thereof with suitable friction such that when the desired position of the guided member relative to the brackets 56 is obtained the position will be maintained so as to hold the workpiece. In the embodiment illustrated, the securing plates 59 are configured to fit within recesses 61 provided in each respective bracket 56. Each of the brackets 56 in turn are mounted to a support plate 62 with fasteners 64.

Support block 41, which typically will directly engage the workpiece, is secured to the guided member 52 with fasteners such as fasteners 65 extending through suitable apertures in the guided member 52 and the cup member 42. A fitting 66 can be provided and is connected to suitable passageways in order to draw a vacuum in the cup member 42 when desired.

Rather than having the aligning fixture apply force directly upon the support block 41 and/or the vacuum cup 42 to obtain the desired position thereof, the guided member 52 is arranged with surfaces that can be engaged. In the embodiment illustrated, a plate member 68 is disposed about the vacuum cup assembly 23 and secured to the guided member 52 with fasteners 70 to provide surfaces that can be engaged by aligning fixture 18. In one embodiment as illustrated, plate member 68 and/or the guided member 52 can include aligning surfaces 74 herein illustrated as recesses that cause the aligning fixture 18 to engage or grip the plate member 68 in a known, predetermined manner so that in turn the position the head 22 can be adjusted in a selected position when desired. As appreciated by those skilled in the art, other forms of aligning surfaces formed or provided on, for example, protrusions or apertures can be used.

The aligning fixture 18 has complementary members adapted to engage and release the aligning surfaces 74 when desired. In one embodiment, the aligning fixture 18 includes movable member(s) or fingers that can grip and release the head 22 using the aligning surfaces as they are formed on the head 22. In many applications but maybe not all applications, it is important that the aligning fixture 18 grip the head 22 in a known manner so that accurate and repeatable coupling exists between the aligning fixture 18 and the head 22. In this manner, the aligning fixture 18, when moved, will also move the head 22 to the desired position in order to support a portion of the workpiece.

A particularly advantageous feature of the pivoting assembly 50 is that it is configured so that pivoting motion of the guided member 52 results in the support block 41 (or other element engaging the workpiece) pivoting about an axis 41B (FIG. 3) that coincides with the point of contact with the workpiece. In other words, the point of contact lies on or intersects with the axis about which the pivoting assembly 50 pivots. In the embodiment illustrated, the axis would lie on the contact surface 41A of the support block 41. Specifically, the guided member 52 and guiding assembly 53 are configured so as to place the axis 41B about which pivoting occurs on (coincides with) the contact surface 41A of the support block 41 (i.e. the point of contact with the workpiece). In the embodiment illustrated, the radius of the projection 60 and/or the channel 58 coincide with the axis 41B at this position. This feature is particular advantageous because no compensating adjustments or calculations need to be made and performed by component(s) of the positioning system 11 in order for the system 11 to adjust the head 22 so that it is in a proper position to support the workpiece.

In order to position head 22 in a reference position about a longitudinal axis 24A extending through rod 24, a twisting mechanism 80 (FIGS. 3 and 5) is provided to rotate head 22 and rod 24 about the longitudinal axis 24A of rod 24. Twisting mechanism 80 includes complimentary engaging surfaces 82 and 84. Engaging surface 82 is fixedly secured to head 22 or rod 24, while engaging surface 84 is fixedly secured to brake 26, which is held in a fixed stationary position. Of course, any other element held in a fixed stationary position could also be used instead of brake 26. In the embodiment illustrated, twisting mechanism 80 operates to rotate or twist head 22 and rod 24 as head 22 and rod 24 are lowered toward brake 26. Engaging surfaces 82 and 84 engage each other as the rod 24 and head 22 are lowered and slip by each other to cause twisting of the rod 24 toward the selected position where the surfaces 82 and 84 come to rest in a reference position. Although various forms of complimentary engaging surfaces 82 and 84 can be used, in a particular advantageous embodiment, the complimentary engaging surface 82 includes a portion 82A that converges to a narrower end or point that upon engagement with any portion of the engaging surface 84 causes the portion 82A to twist rod 24 about longitudinal axis 24A and slide downwardly so that portion 82A comes into engagement with a complimentary portion 84A formed on engaging surface 84.

Figure 5:
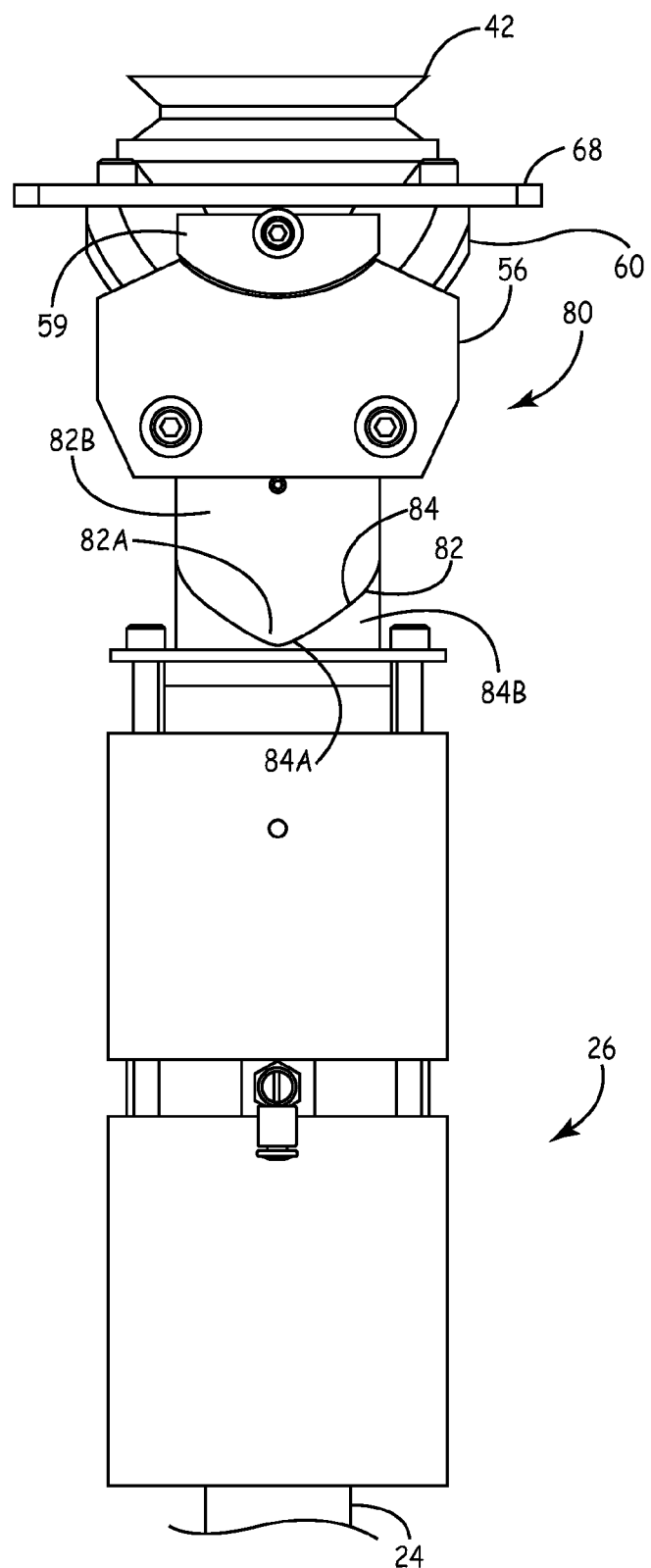
FIG. 5 is an elevational view of a portion of the support assembly.

Referring also to FIG. 5, in a further embodiment, engaging surfaces 82 and 84 are each formed on corresponding collars 82B and 84B that encircle rod 24. Engaging surfaces 82 and 84 are generally at least proximate to if not residing in a plane 88. Plane 88 is oblique to rod 24 and longitudinal axis 24A. As illustrated, rod 24 extends through plane 88. Stated another way, different portions of the engaging surface 82 are located at different axial positions along the longitudinal axis 24A.

Figure 6:
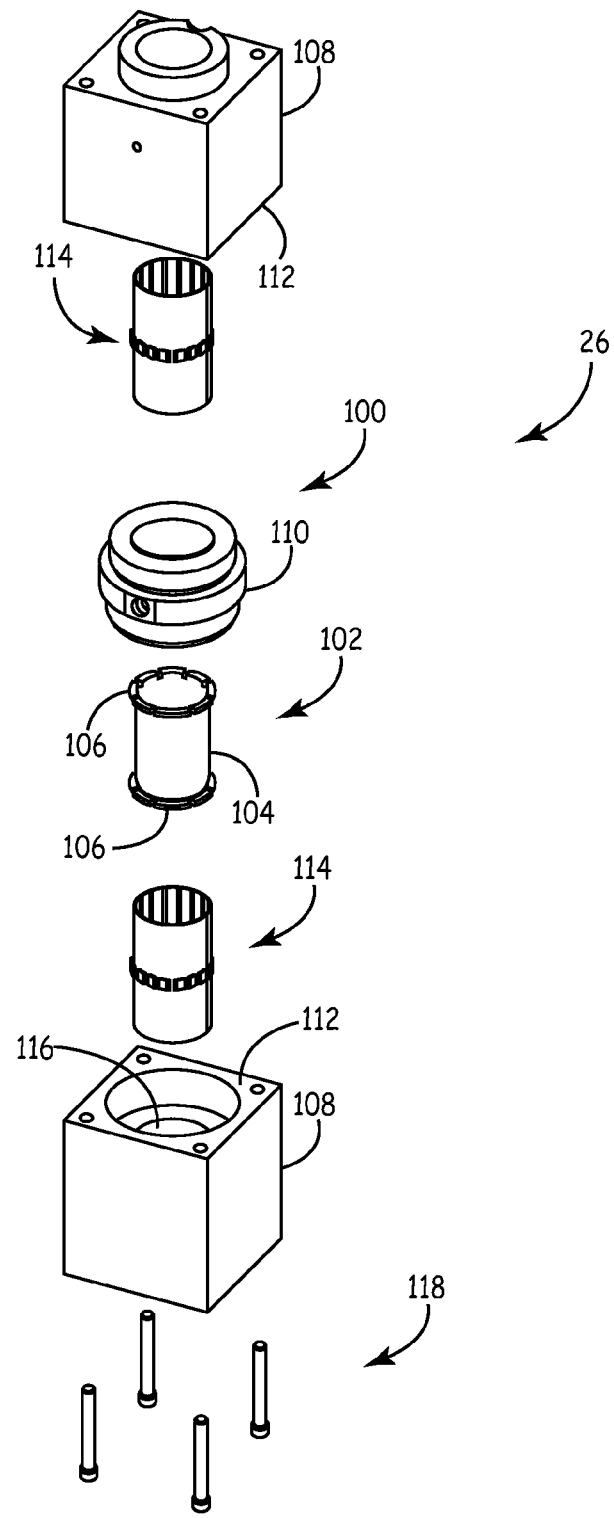
FIG. 6 is an exploded perspective view of a brake assembly.

Various forms of brakes can be used to hold rod 24 along its longitudinal axis in a desired position. An advantageous form of brake 26 is illustrated in FIG. 6. In this embodiment, brake 26 includes an expandable member 100 herein in the form of an expandable tubular body encircling the rod 24. When pressurized by a suitable fluid such as air, the expandable body 100 expands inwardly, reducing the diameter of its center aperture, to create a force that is applied to an outer surface of the rod 24. Although the inner surfaces of expandable body 100 could be configured to engage rod 24 directly, in a further embodiment, a gripping sleeve 102 is interposed between the outer surface of the rod 24 and inner surfaces of expandable body 100. The gripping sleeve 102 substantially encircles the rod 24 but includes a longitudinal slot 104 so as to allow surfaces defining slot 104 to compress toward each other (decreasing the diameter of sleeve 102) due to forces created by the expandable body 100.

In yet a further embodiment, gripping sleeve 102 can include flanges 106 at opposite ends thereof, or otherwise be configured so as to engage inner surfaces of support blocks 108. In other words, when assembled, gripping sleeve 102 can not move longitudinally along axis 24A between support blocks 108, but rather, is held in a fixed position longitudinally. Thus, when brake 26 is operated, the brake 26 holds rod 24 in a fixed longitudinal position as a rigid connection is formed between blocks 108 (where one or both are attached to a suitable stationary frame member) and the gripping sleeve 102, that in, turn grips rod 24. It should be noted expandable body 100 includes a mounting flange, herein annular ring 110, that is trapped between and engages end surfaces 112 locks 108 which face each other.

Suitable bearing assemblies are provided in brake 26 to allow sliding movement of rod 24 relative to brake 26, when brake 26 is not actuated. In the embodiment illustrated, a bearing assembly 114 is provided for each of the blocks 108. Each of the bearing assemblies 114, which can comprise individual bearing elements, or be formed from a suitable bearing compound well known in the art, is received in counter bores 116 provided in each of the blocks 108. Fasteners 118 join support blocks 108 together.

Figure 7:
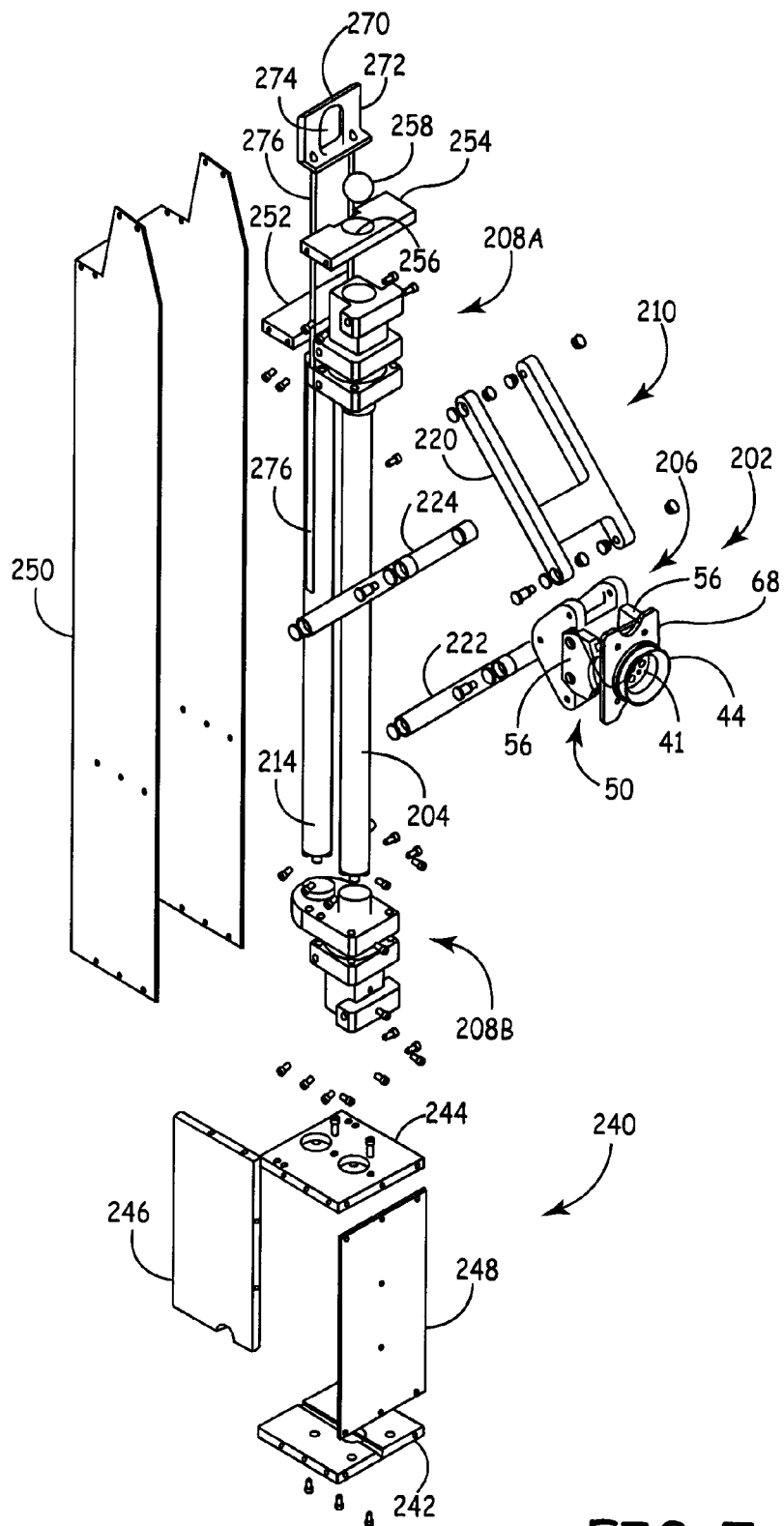
FIG. 7 is an exploded perspective view of a second embodiment of a support assembly.
Figure 8:
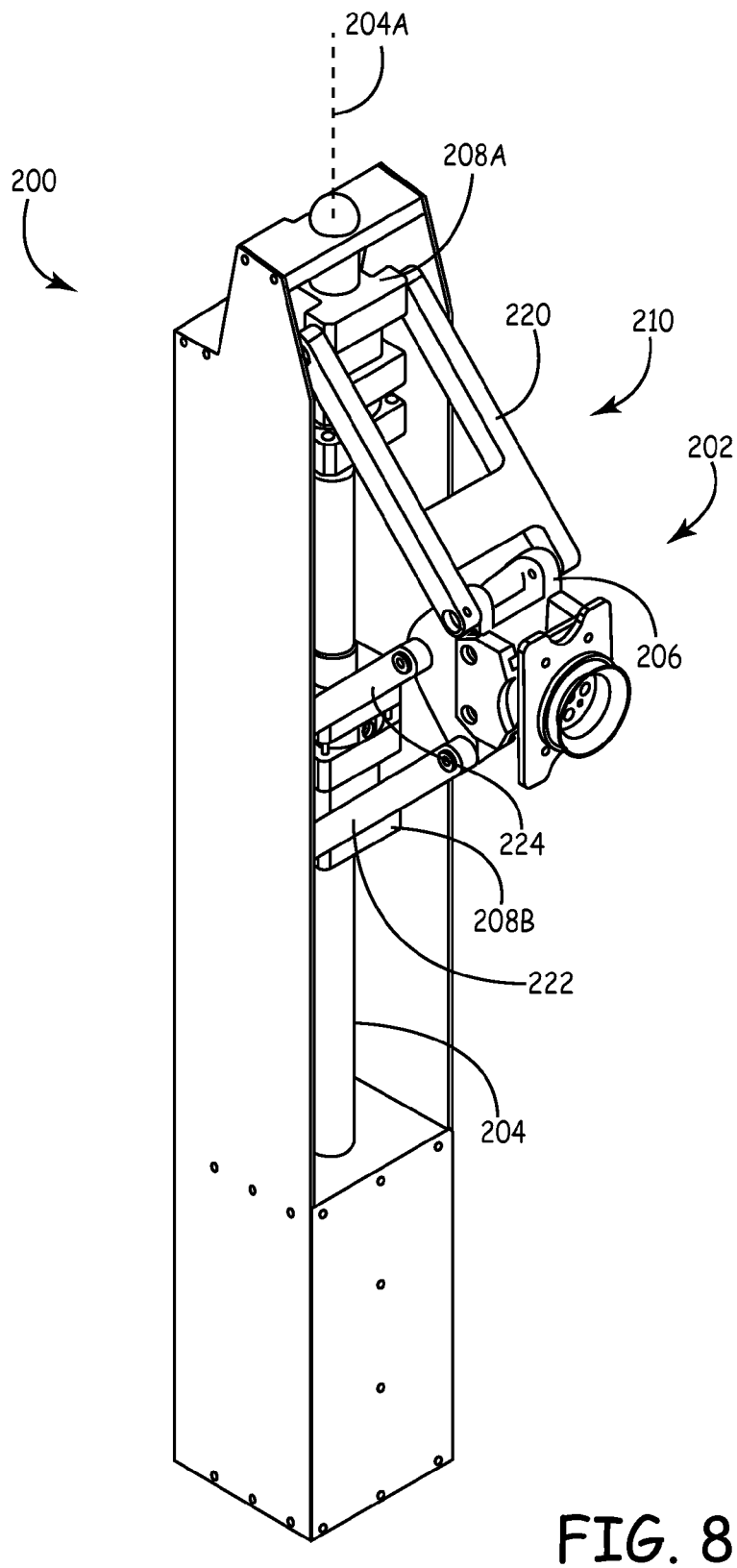
FIG. 8 is a perspective view of the second embodiment of the support assembly.

A support assembly 200 having a workpiece holding head 202 that can move in at least two degrees of freedom relative to a support rod 204 is illustrated in the FIGS. 7-8. Head 202 is similar to end or head 22 described above and similar components of head 202 are identified with same reference numbers as used above with respect to head 22. In this embodiment, support brackets 56 are mounted to a movable base 206 that is coupled to support rod 204 to move relative thereto in at least two dimensions via a coupling assembly 207. The coupling assembly 207 includes at least one sliding member coupled to the movable base 206 with an optional link assembly. In the embodiment illustrated, an upper brake assembly 208A and a lower brake assembly 208B slidable on support rod 204 and a link assembly 210. In addition to pivotable movement of head 202 in a manner similar to head 22 described above, head 202 is movable at least in a two-dimensional space relative to support rod 204. In particular, head 202 is movable up and down in a direction parallel to a longitudinal axis 204A of rod 204 as well as in a direction orthogonal to the longitudinal axis 204A of rod 204 along a substantial length of rod 204. Stated another way, the two-dimensional space is defined by movement of the head 202 along an axis parallel to the axis of support rod 204 and/or in a direction inwardly or outwardly with respect to the support rod 204. However, the head 202 can move in a three-dimensional space due to rotation of the head 202, link assembly 210 and brake assemblies about the axis 204A of the support rod 204, if desired. Positioning of head 202, and in particular movable base 206, in a two or three-dimensional space is obtained by selective positioning of the upper brake 208a and the lower brake 208b along and/or about the support rod 204.

In one embodiment though, an alignment rod 214 is provided and is disposed parallel to support rod 204 in order to inhibit movement of head 202 and moveable base 206 about longitudinal axis 204A. In the exemplary embodiment, only lower brake 208B is slidable along support rod 204 and alignment rod 214, although either or both can be configured as such.

Link assembly 210 includes an upper link arm 220 joining the moveable base 206 to the upper brake 208A and two spaced-apart links comprising a control arm 222 and a swing arm 224 both of which pivotably join the moveable base 206 to the lower brake 208B. The link assembly 210 hereby maintains a fixed orientation of movable base 206 with respect to support rod 204, but allows up and down and inward and outward movement of the movable base 206 as described above. As appreciated by those skilled in the art, link assembly 210 can take numerous forms, wherein the present embodiment should not be considered limiting.

Figure 9:
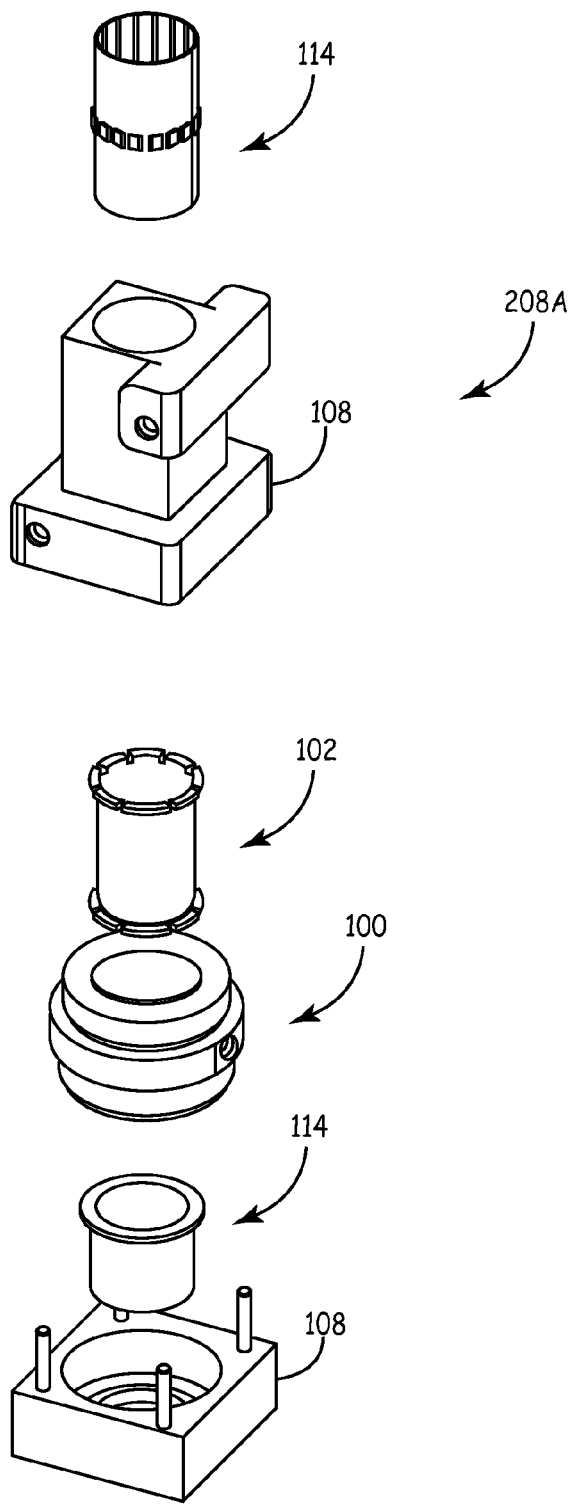
FIG. 9 is an exploded view of an upper brake assembly for the support assembly of FIG. 8.
Figure 10:
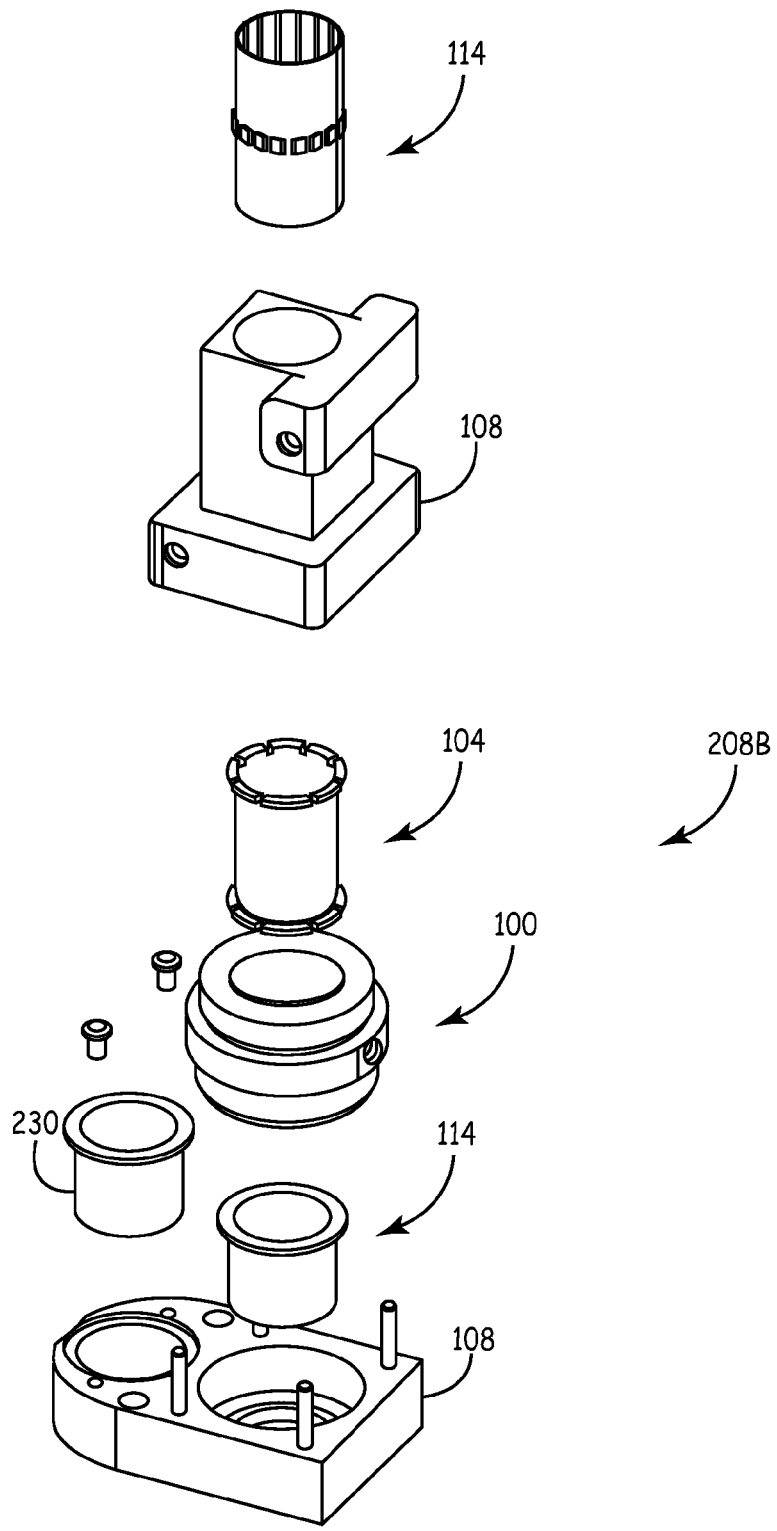
FIG. 10 is an exploded perspective view of lower brake assembly for the support assembly of FIG. 8.

In the embodiment illustrated, both upper brake 208A and lower brake 208B are constructed in a manner similar to brake 26 described above where like components have been identified with similar reference numbers. The upper brake 208A is illustrated in FIG. 9 while the lower brake 208B is illustrated in FIG. 10. This lower brake 208B also slides along alignment rod 214. Brake 208B includes an additional bearing sleeve 230. The brakes 208A and 208B can be operated simultaneously or separately as desired.

Referring back to the embodiment of FIGS. 7 and 8, support rod 204 and alignment rod 214 extend upwardly from a base 240. In the exemplary embodiment, base 240 includes a plurality of plate members herein a lower plate member 242, an upper plate member 244 and two vertically oriented plate members 246 and 248. An upstanding frame member 250 provides support for the support rod 204 and alignment rod 214 on ends opposite the base 240. A first transverse plate 252 extends between panels of frame support 250 to provide rigidity. A second transverse plate 254 includes an aperture 256 to which a ball element 258 can be placed that is used to engage and secure an end of the support rod 204 remote from the base 240.

As an advantageous feature, the head 202, and in particular, the moveable base 206 can be selectively returned to a reference position. In the embodiment illustrated, this occurs when the upper brake 208A and the lower brake 208A are brought together at an end of the support rod 204. In one embodiment, this can occur at the end proximate the base 240 by disengaging each of the brakes 208A and 208B and allowing them to slide along and settle at the bottom of the support rod 204 proximate base 240. However, in an alternative embodiment, the upper brake 208A and the lower brake 208B can be brought to the top of the support rod 204 remote from the base 240 where upon the brakes 208A and 208B are engaged or operated so as to maintain their position at the top of the support rod 204. In this alternative embodiment, a lifting bracket 270 can be provided and used to selectively lift lower brake 208B, which in turn, will engage and lift upper brake 208A as needed. Of course, engagement of the lower brake 208B with the upper brake 208A is not required if the lower brake 208A and the upper brake 208A otherwise obtain reference positions relative to each other, for instance, again using lifting bracket 270. For example, the link assembly 210 could be of a construction that inhibits contact between the lower brake 208B and the upper brake 208A, but nevertheless, the positions of the lower brake 208B and the upper brake 208A are known and repeatable using, for instance, lifting bracket 270. Likewise, an intermediate spacer, for example, also secured to and possibly slidable on support rod 204 can be present that would inhibit contact between the lower brake 208B and the upper brake 208A. The spacer could be used to help define one or both of the reference, repeatable positions of the lower brake 208B and the upper brake 208A, when for example lifting bracket 270 is used, or the spacer would not otherwise contribute to unrepeatability of the lower brake 208B and the upper brake 208A from obtaining such reference positions.

In the embodiment illustrated, lifting bracket 270 includes a plate member 272 having an aperture 274 into which a lifting hook (now shown) can extend therethrough when necessary to lift bracket 270. Elongated rods 276 extend downwardly from plate 272. The rods 276 slidably extend through apertures in brake 208B. Ends of the rods 276 remote from the plate 272 have enlarged heads that are larger than the apertures in brake 208B. In this manner, when lifting bracket 270 is lifted upwardly enlarged heads on rods 276 will engage and lift the lower brake 208B. Subsequently, when the brakes 208A and 208B disposed at the end of the support rod 204 remote from the base 240 are operated so as to maintain a fixed position, the lifting bracket 270 can be lowered since the rods 276 slide through the apertures provided in the lower brake 208B.

Figure 11:
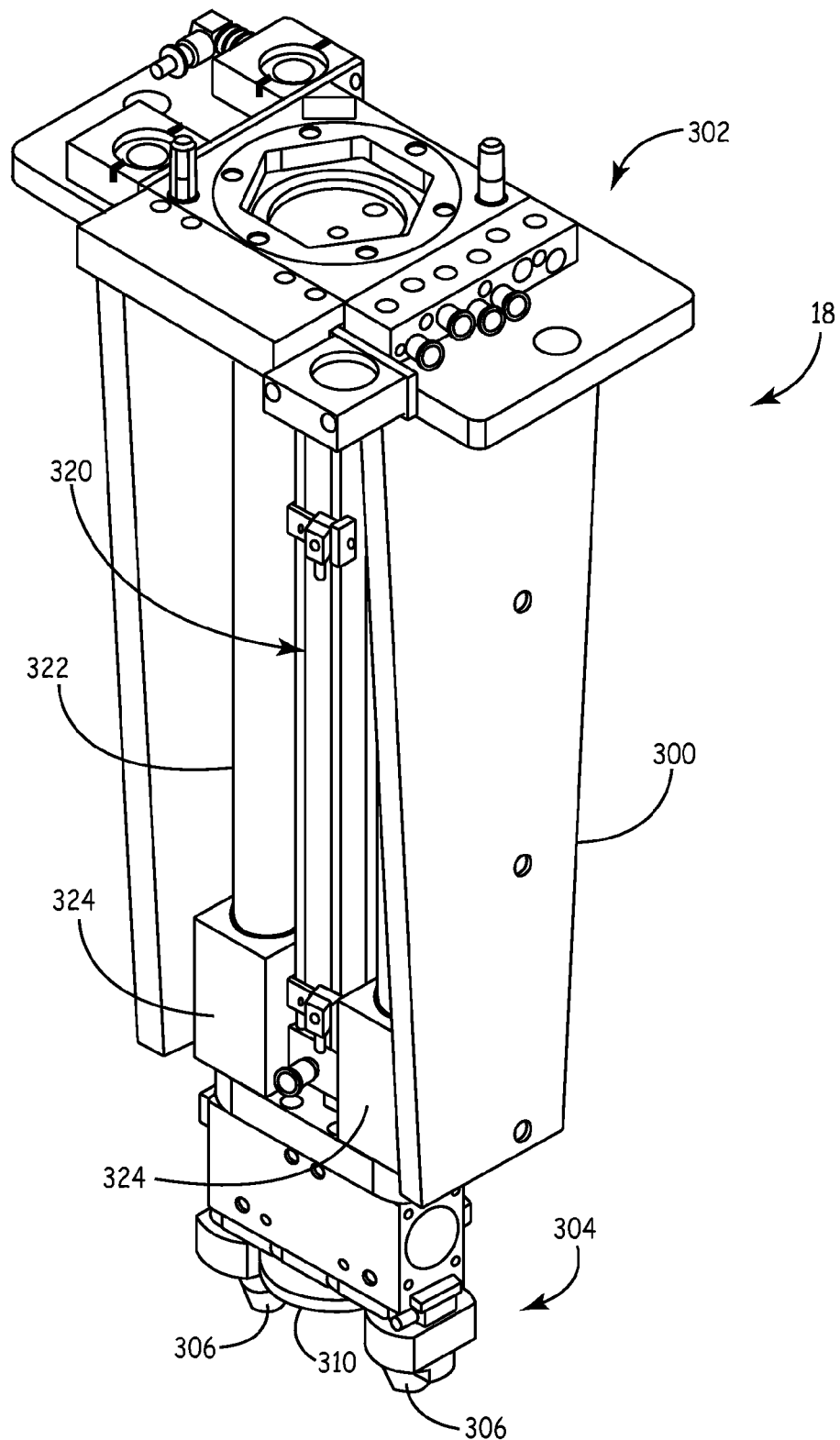
FIG. 11 is a perspective view of an aligning fixture.
Figure 12:
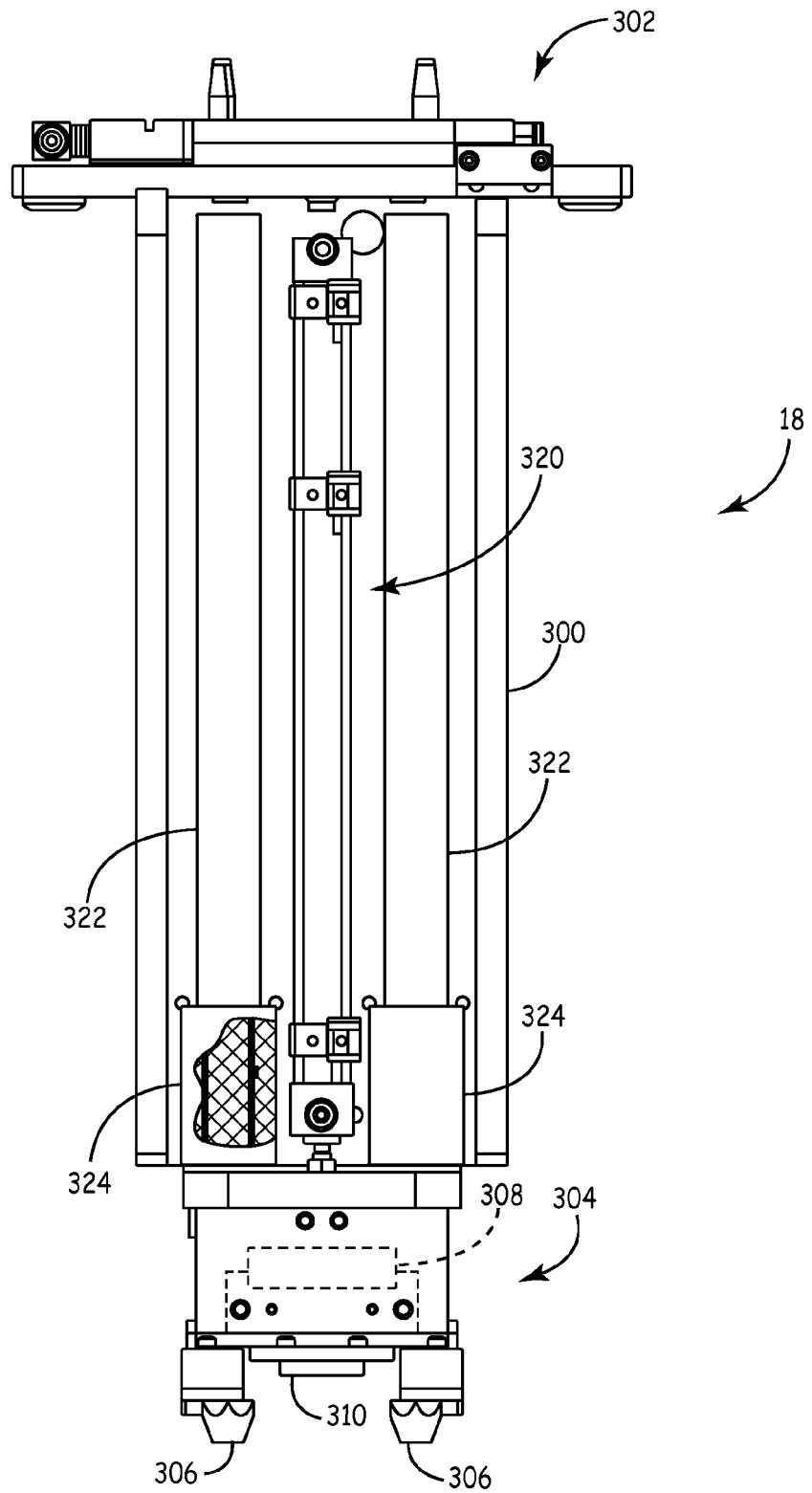
FIG. 12 is a front elevational view of the aligning fixture.
Figure 13:
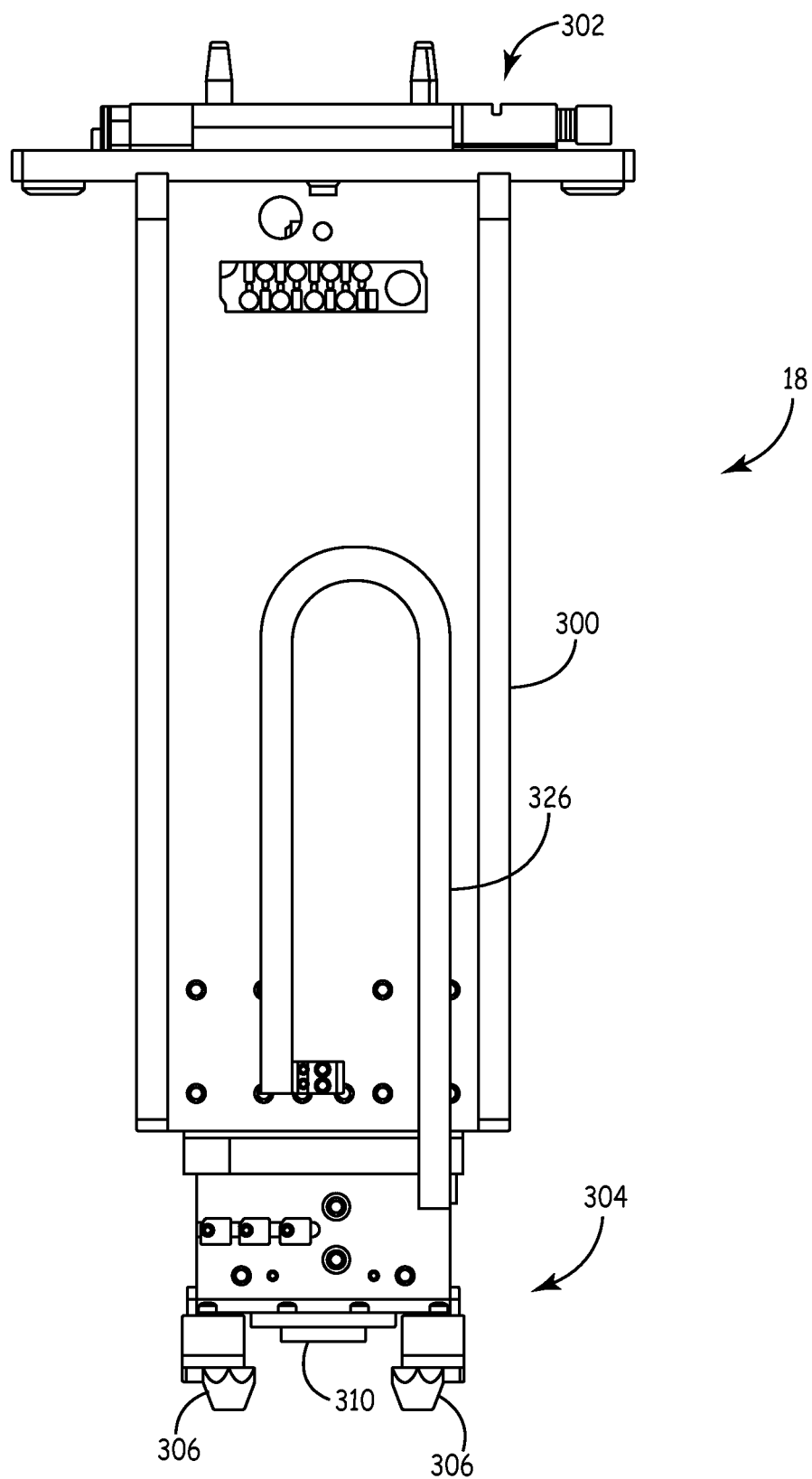
FIG. 13 is a rear elevational view of the aligning fixture.

The aligning fixture or assembly 18, which is of exemplary form, is illustrated in FIGS. 11-13. Generally, the aligning fixture 18 includes a frame 300, an interface coupling 302 and a gripper assembly 304. The interface coupling 302 selectively couples to end effector 21 and includes fluid ports and/or electrical connections to operate the aligning fixture 18. The gripper assembly 304 includes gripping fingers or projections 306 one or both of which are movable by an actuator(s) (schematically illustrated at 308, where dashed lines extending from the actuator 308 represent rods, levers, etc that connect the actuator(s) to the gripping finger(s)s 306) to grasp the heads 22 or 202 so as to allow reorientation thereof. (As appreciated by those skilled in the art such an actuator assembly can take a wide variety of forms, the structure of which is not pertinent to the inventive aspect herein described.) As discussed above, plate 68 can be provided with aligning recesses 74, which the gripping fingers 306 can engage in order to provide a predetermined position between the head 22 or 202 and the aligning fixture 18.

Also provided on gripper assembly 304 is registration plate 310, which emulates the position of a portion of a workpiece the support assembly 19,200 will support. If the support assembly 19,200 is equipped with a vacuum cup 42, a vacuum can be drawn with engagement of the vacuum cup 42 upon registration plate 310. A pressure sensor (not shown) fluidly coupled to a port in the registration plate 310 can be provided to sense the vacuum and ensure a proper seal is obtainable. If desired, the vacuum can pull the head 22/202 until the block 41 contacts the registration plate 310. If a desired vacuum has been obtained this can indicate proper operation and position has been obtained. When desired, atmospheric air can be allowed to enter the vacuum formed in the cup 42, thereby releasing the vacuum. The support assembly 19,200 can include a valve to allow air into cup 42. At this time or earlier, the brake 26, 208A, 208B of the support assembly 19,200 can be operated to lock the position of the head 22, 200.

In a further embodiment, aligning fixture 18 can include an actuator 320 such as a fluid operated piston/cylinder or screw operated actuator that is connected to the gripper assembly 306 and frame 300 to allow the gripper assembly 306 to move relative to frame 300. In the embodiment illustrated, aligning rods 322 move with the gripper assembly 306 relative to support bearings 324 to maintain alignment of the gripper assembly 306 when extended or retracted. Suitable cabling 326 is provided between the gripper assembly 306 and the frame to maintain electrical and/or fluid connections.

The aligning fixture 18 is mounted to the end effector 21, or support therefore, and is used to align each head 22 and/or head 202 of each support assembly 19, 200 for the workpiece to be supported by the holding assembly 17. Generally, the desired position for each head 22, 202 of each corresponding support assembly is provided to a controller 160 in FIG. 2. The controller 160 provides suitable control signals (represented by arrow 162) to operate motors controlling the placement of the bridge 10 on the guide rails 13, the mast 12B on the bridge 10, the extension of the mast 12B and the orientation of the end effector 21 in order to obtain desired positions of the aligning fixture 18. The controller 160 also operates (e.g. brakes, vacuum, etc.) each of the support assemblies 19, 200 herein represented by arrow 164.

In one embodiment, the positions of each head 22, 202, or specifically, the support blocks 41 thereof, can be ascertained manually by placing the workpiece on the holding assembly 17 and individually adjusting each of the support assemblies 19, 200 until the proper position of each remote end 40 has been obtained at which point measurements can be obtained and stored for future use. In another embodiment, a representation of the holding assembly 17 is stored in memory of a computer represented by block 168 thereby comprising an analytical model. A model of the workpiece is combined with the model of the holding assembly 17 so as to calculate the orientation and/or position of each head 22, 202 of each support assembly 19, 200 that will be used to support the workpiece. The positional information of each remote end calculated from the model 168 is then used by the controller 160.

With the positional information known for each head 22, 202 of each support assembly 19, 200 and the aligning fixture 18 coupled to the end effector 21, or support therefor, the controller 160 operates the system to cause the aligning fixture 18 to engage a selected support assembly 19, 200 and adjust the corresponding head 22, 202 to coincide with the surface of the workpiece to be placed on the holding assembly 17.

Figure 14:
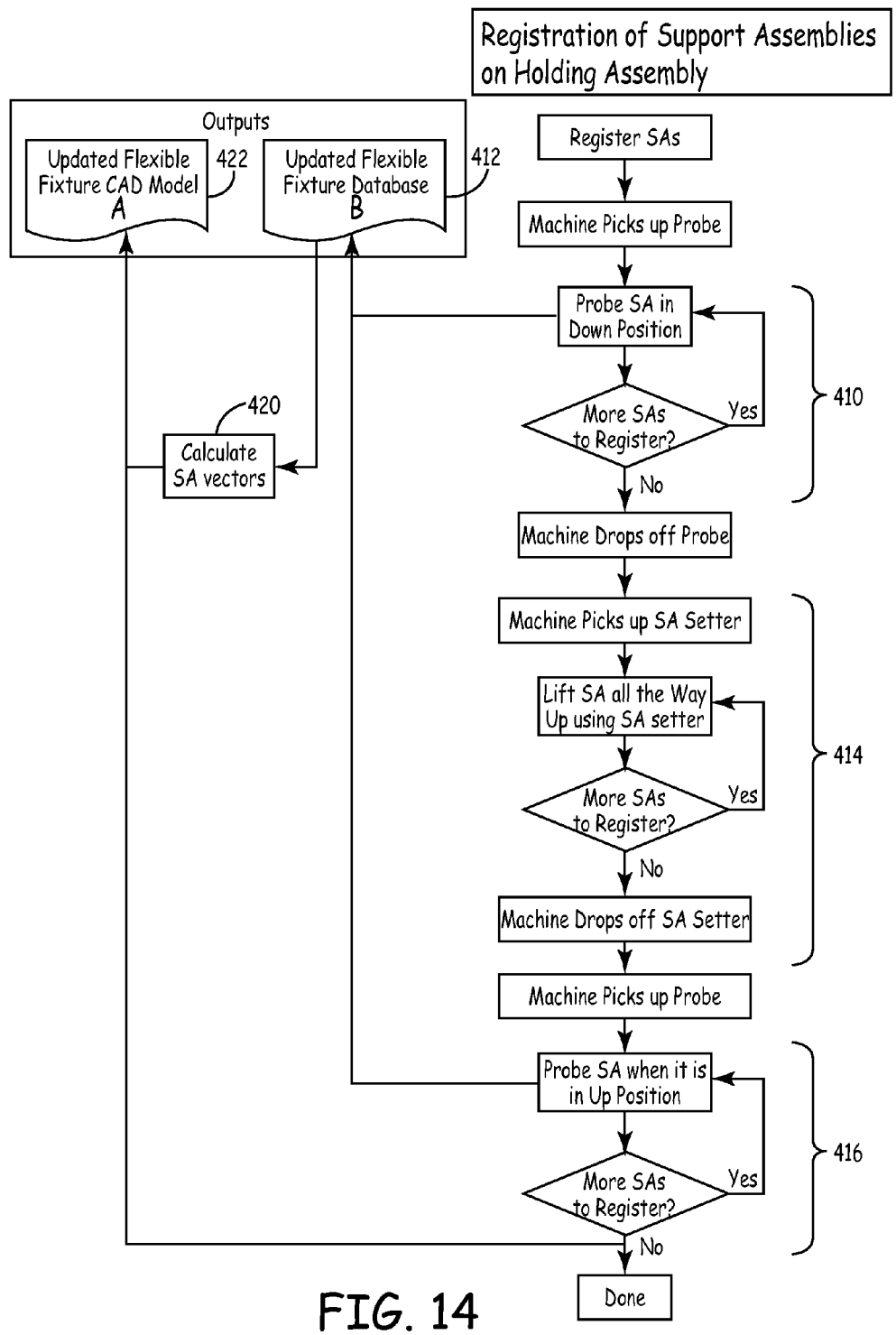
FIG. 14 is a flow chart for registration of support assemblies on a holding assembly.

FIGS. 14-17 are flowcharts illustrating registration of support assemblies ("SA") on the holding assembly, support assembly programming for a specific workpiece or part, actual setting of the support assemblies for the part, and loading the part on the fixture, respectively. Referring first to FIG. 14, this flowchart illustrates registration of support assemblies (19 and/or 200, herein "19,200") on the holding assembly 17, which includes taking measurements of the support assemblies 19, 200 so as to provide corrections due to minor positional errors depending on the extension of the support assembly 19, 200. For purpose of explanation and understanding only, assume that a support assembly 19 or 200 is to be mounted on a holding assembly 17 so that extension would be vertically such as illustrated in FIGS. 18 and 19. As another aspect of the invention, compensation is provided in configuring each support assemblies 19, 210 for positioning errors that can result from differences between the predicted position of the end of the support assembly 19, 200 and its actual position, and in a further embodiment, particularly for positioning errors that are dependent upon selective extension of the corresponding support assembly rod 24, 204.

Figure 20:
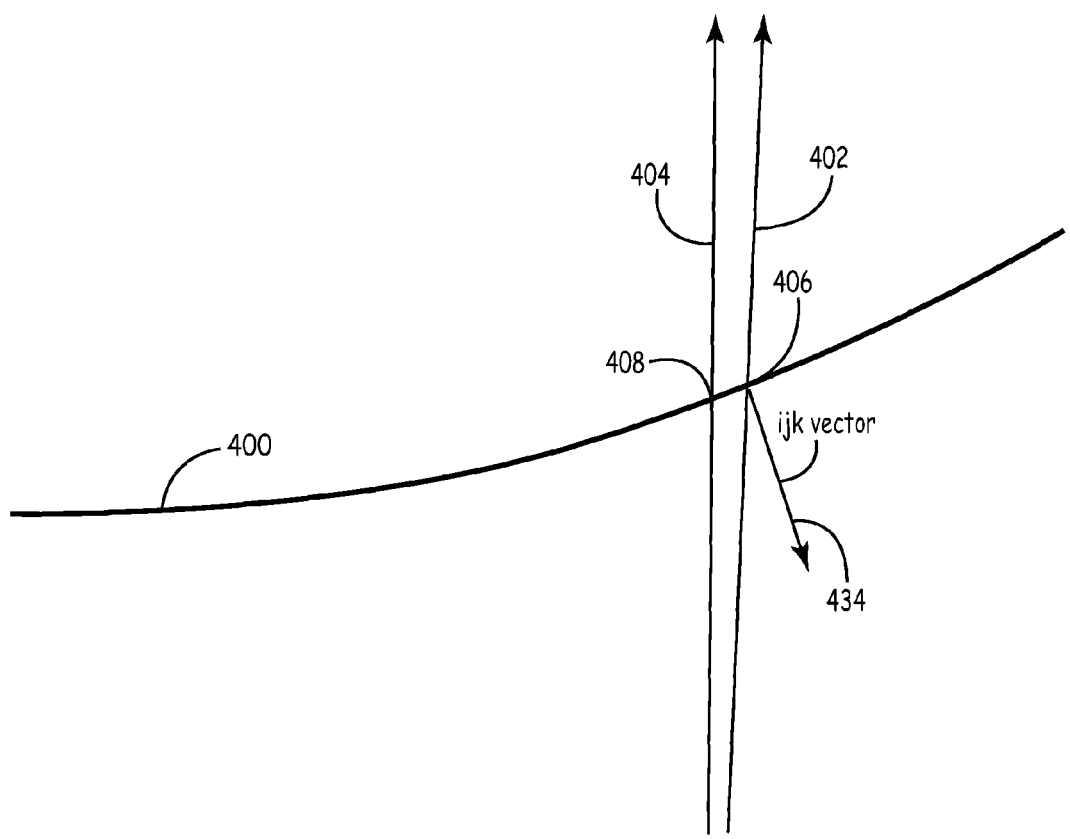
FIG. 20 is a graphical illustration of positional errors.

Referring to FIG. 20, a portion of a workpiece is illustrated at 400, while extension of the rod of a support assembly is indicated by line 402. In other words, line 402 represents actual extension of the rod, while line 404 represents a perfect normal line that the rod (positions of the head) would have presumed to extend given the location of the support assembly 19, 200 on the holding assembly 17. There thus exists positioning errors for one, some or all of the support assemblies when in use. In FIG. 20, it can be seen that the support assembly 19, 200 would actually support the workpiece at location 406 while it would have been presumed that it should hold it at predicted location 408. It is this difference between presumed and actual holding that is compensated for with the techniques described herein. It should be understood that the difference between lines 402 and 404 and locations 406 and 408 have been exaggerated for purposes of illustration and understanding.

Referring back to FIG. 14, with the holding assembly 17 populated with support assemblies 19, 200, the positioning system 11 uses a probe on the end of end effector to ascertain positions of each of the support assemblies 19, 200 so as to provide compensation for each of the support assemblies 19, 200. In the embodiment illustrated, steps indicated by bracket 410 illustrate recording the preselected reference position of the support assemblies 19, 200 prior to movement to a position to hold the workpiece. For support assembly 19, this typically corresponds to an unextended position or "down" (lowermost) position of the head 22 of the support assembly 19 as provided by way of example in FIG. 14. For support assembly 200, the preselected reference position can be the lowermost or the uppermost position of the movable base 206 relative to the rod 204. (If necessary, it should be noted that each of the heads 22, 202 can be oriented (i.e. tilted) as necessary to achieve the reference positions.) These positions (e.g. with respect to a three axis coordinate system) are recorded, for example by controller 160, in a database 412 on computer readable medium such as memory, hard disk, etc. Steps indicated by bracket 414 illustrates reconfiguration of positioning assembly 11 to use an end effector 21 such as aligning fixture 18 suitable to engage each of the support assemblies and position each in an "extended" position (i.e. a position that is remote from the corresponding reference position). By way of example in FIG. 14, this position is referred to the "up" position, which would be typical for support assembly 19. For support assembly 200, the extended position would be remote from reference position, for example, where the link assembly 210 extends the head 202 outwardly and at generally at an opposite end of the shaft 204.

Similar to steps 410, steps indicated by bracket 416 record the extended position of each of the support assemblies which is also stored in database 412. Using the extended and reference positions of each of the support assemblies, a vector in three dimensional space can be ascertained for each support assembly 19, 200 to represent the position errors associated with each support assembly 19, 200, and stored if necessary, as indicated by step 420. Generally, ascertaining the positional errors of each support assembly 19, 200 provides a basis upon which compensation can be provided for each support assembly 19,200, if needed, so as to hold the workpiece better (such as but not limited to providing more accurate support or positioning of the workpiece, more stability of the workpiece on the holding assembly 17 and/or minimize stress induced in the workpiece from the holding assembly 17). Compensation can include positioning the head of the support assembly based on the ascertained positioning error for that support assembly, which can also include adjusting the rotation of the head about the support rod and/or tilt of the head.

The fixture or holding assembly 17 with the support assemblies 19, 200 is modeled in a CAD environment that allows an operator to see and adjust in a virtual manner the holding assembly 17 with a suitable computer as is known in the art. Data 422 indicates that the CAD model of the holding assembly 17 with support assemblies 19, 200 is updated with the support assembly vectors at step 420 which take into account errors due to the actual positions of each of the support assemblies 19,200 when each is selectively positioned at a holding position to support the workpiece (i.e. when the support assembly needs to be moved from its reference position to some extended position to hold/contact the part or workpiece).

Figure 15:
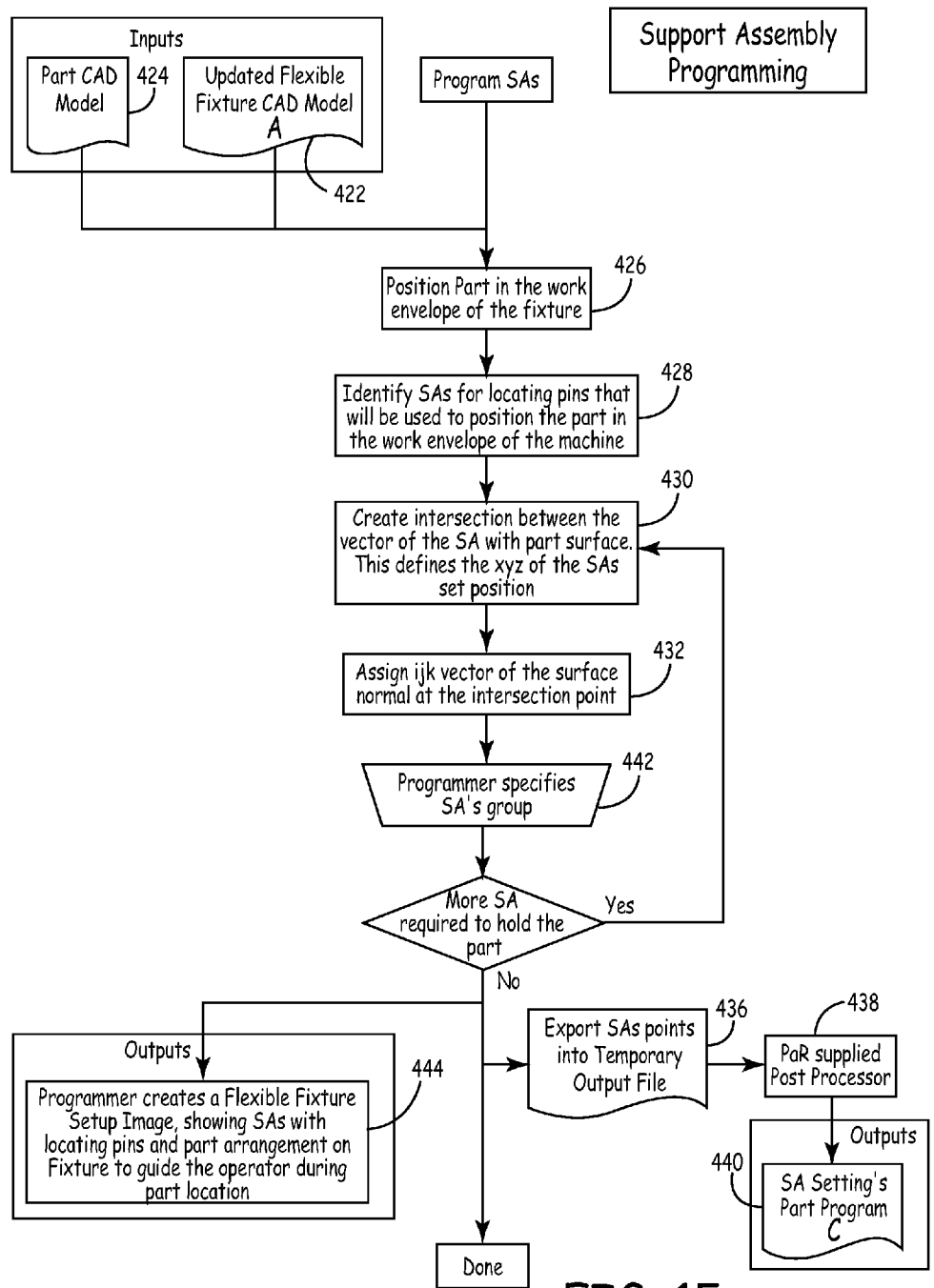
FIG. 15 is a flow chart for support assembly programming.

FIG. 15 illustrates support assembly programming in a CAD or virtual environment simulated on a computer. Using a CAD model of the part 424 and the updated CAD model 422 of the holding assembly 17, the operator virtually positions the part in the work envelope of the fixture or holding assembly 17 as indicated at step 426. Step 428 illustrates identification of support assemblies 19,200, typically two, that include a locating element (protrusion or aperture), not shown, for example extending up from or formed into support block 41 that are used to register the workpiece on the holding assembly 17.

At step 430, and using FIG. 20 for illustrative purposes, the location 406 is ascertained where the outer contour of the workpiece and the vector 402 representative of an actual support assembly intersect. In addition, a vector 434 that is normal to the outer surface of the workpiece at the point of intersection 406 is also ascertained at step 432. The location of intersection 406 and the associated vector 434 is ascertained for each support assembly and is data that is recorded on computer readable medium as illustrated at 436. Step 438 represents processing of data 436 so as to ascertain data 440 indicative of parameters that can be used by controller 160 for setting each of the actual support assemblies. As was described above, each support assembly includes a positioning assembly (e.g. 50) that allows the support block (e.g. 41) to be tilted to a desired position. The normal vector 434 is used to calculate the necessary rotation of the support assembly about the axis of its rod (e.g. 24) and the necessary tilt of the positioning assembly to properly orient the support assembly to achieve the intersection point 406. For completeness, step 442 indicates that the support assemblies can be organized in groups as desired, while output 444 indicates that an image of the workpiece on the fixture can be created.

Figure 16:
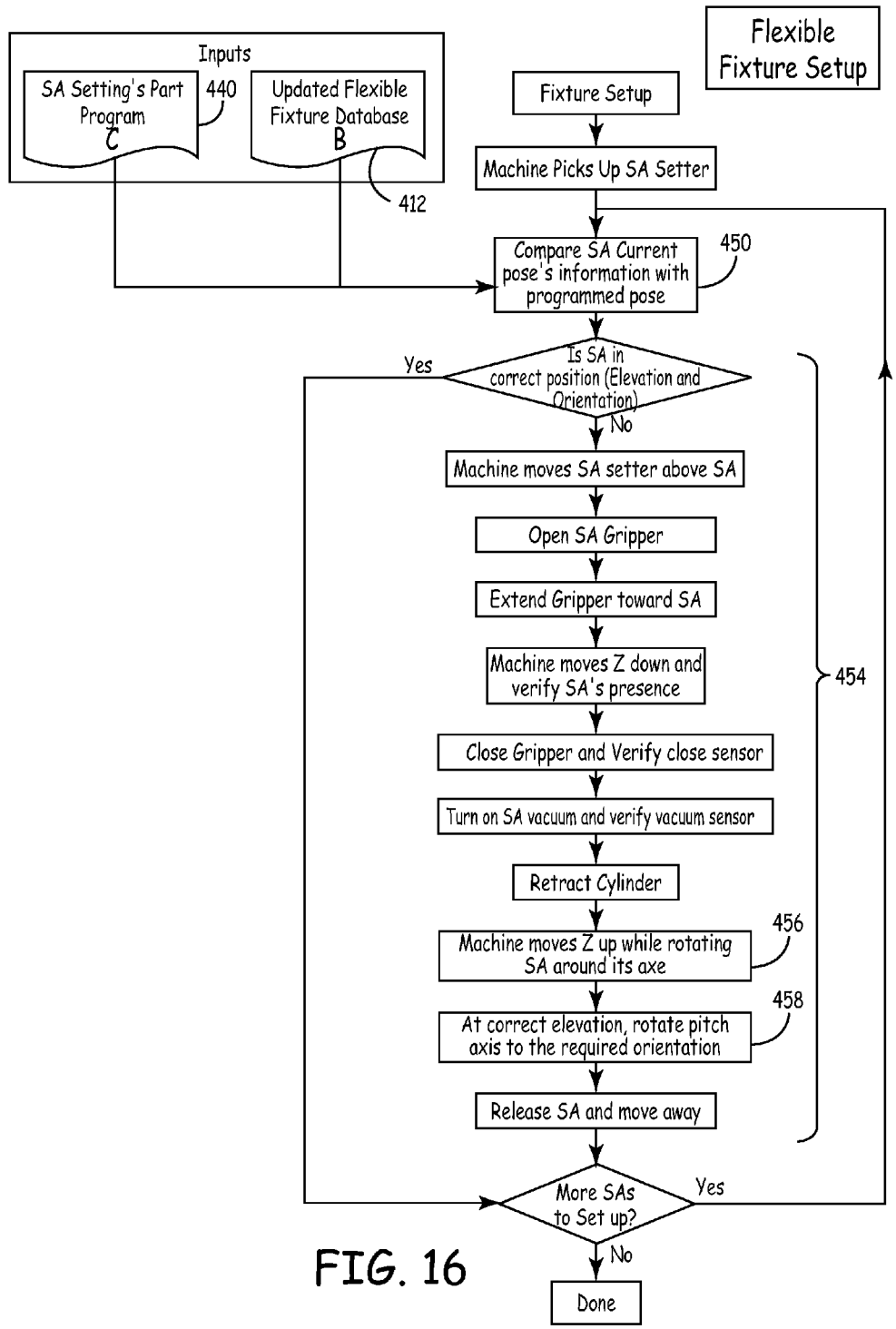
FIG. 16 is a flow chart for adjusting support assemblies.

FIG. 16 illustrates set up of the actual holding assembly to receive the actual part. For this purpose, the controller 160 uses data 440 and data 412. Step 450 represents a check to see if all the support assemblies are properly positioned for the workpiece. For example, if the system is working on a second workpiece that is the same as a first fixture that it just held, there is no need to perform the steps illustrated in FIG. 16.

Figure 17:
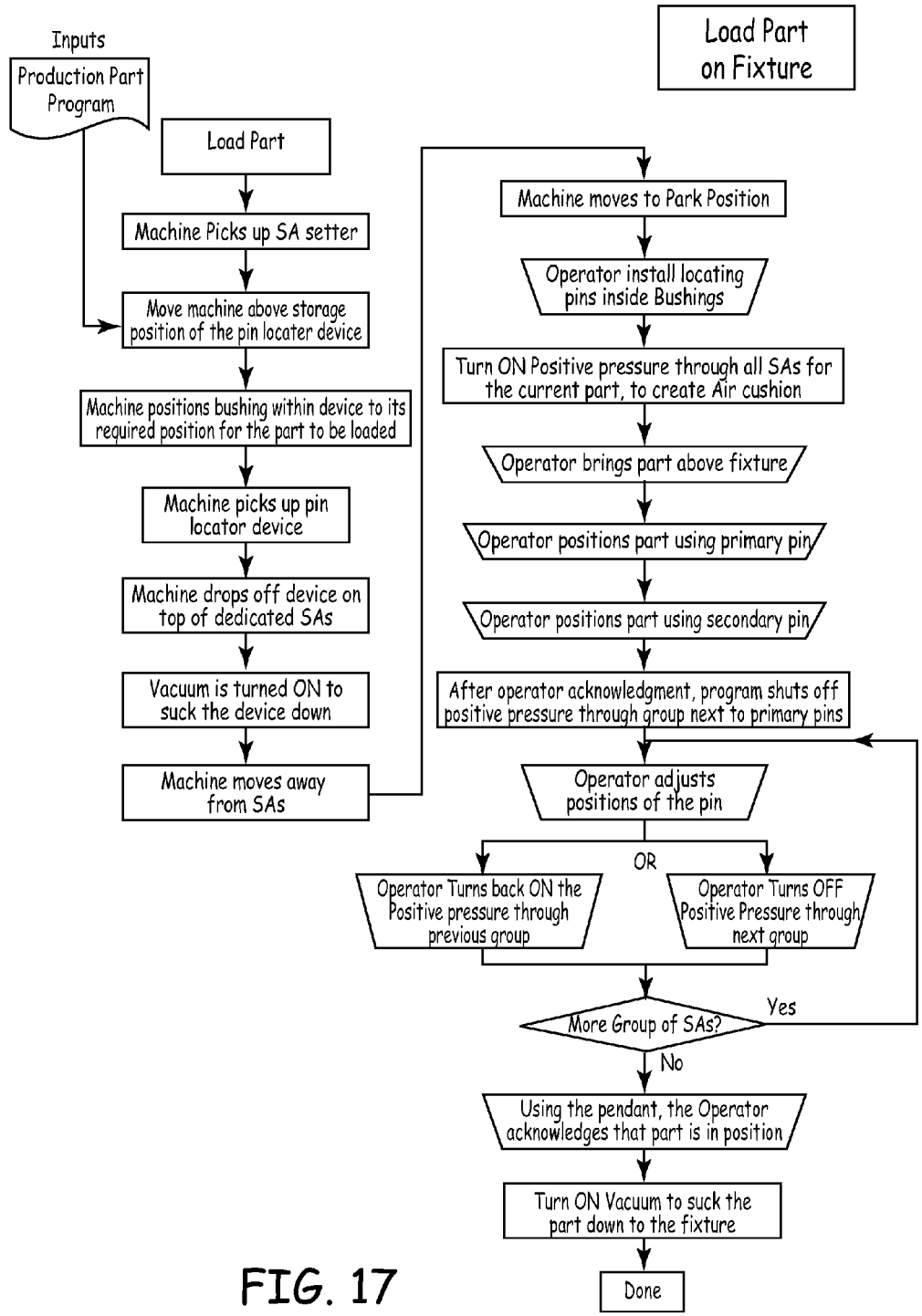
FIG. 17 is a flow chart for loading a part or workpiece on the holding assembly.

Assuming that one or more of the support assemblies 19,200 need to be positioned, each of the support assemblies 19,200 that need positioning are positioned using, by way of example, the steps indicated by bracket 454. It should be noted that steps 456 and 458 relate to obtaining the proper orientation about the axis 24A of the support assembly rod 24 (herein support assemblies 19) and tilt of the support block 50 (support assemblies 19 or 200), as mentioned above. For completeness, FIG. 17 illustrates steps for loading an actual workpiece on the holding assembly 17 once the support assemblies have been properly configured.

Figure 21:
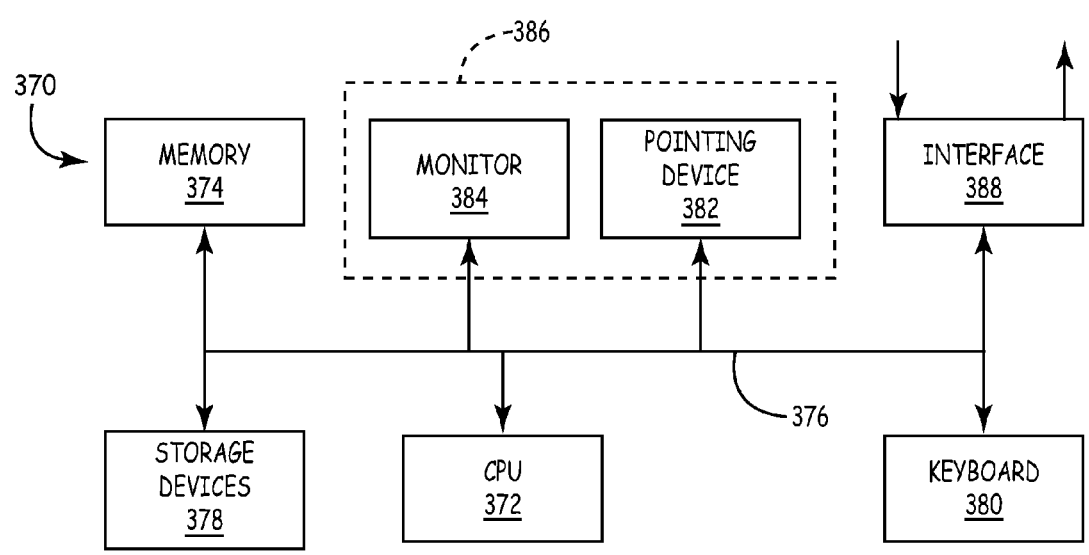
FIG. 21 is a schematic illustration of a computing environment.

The system controller 160 each can be implemented on one or more digital and/or analog computers. FIG. 21 and the related discussion provide a brief, general description of a suitable computing environment in which the system controller 160. Although not required, the system controller 160 can be implemented at least in part, in the general context of computer-executable instructions, such as program modules, being executed by a computer 370. Generally, program modules include routine programs, objects, components, data structures, etc., which perform particular tasks or implement particular abstract data types. Those skilled in the art can implement the description herein as computer-executable instructions storable on a computer readable medium. Moreover, those skilled in the art will appreciate that the invention may be practiced with other computer system configurations, including multi-processor systems, networked personal computers, mini computers, main frame computers, and the like. Aspects of the invention may also be practiced in distributed computing environments where tasks are performed by remote processing devices that are linked through a communications network. In a distributed computer environment, program modules may be located in both local and remote memory storage devices.

The computer 370 illustrated in FIG. 21 comprises a conventional computer having a central processing unit (CPU) 372, memory 374 and a system bus 376, which couples various system components, including memory 374 to the CPU 372. The system bus 376 may be any of several types of bus structures including a memory bus or a memory controller, a peripheral bus, and a local bus using any of a variety of bus architectures. The memory 374 includes read only memory (ROM) and random access memory (RAM). A basic input/output (BIOS) containing the basic routine that helps to transfer information between elements within the computer 370, such as during start-up, is stored in ROM. Storage devices 378, such as a hard disk, a removable data storage device, an optical disk drive, etc., are coupled to the system bus 376 and are used for storage of programs and data. It should be appreciated by those skilled in the art that other types of computer readable media that are accessible by a computer, such as magnetic cassettes, flash memory cards, digital video disks, random access memories, read only memories, and the like, may also be used as storage devices. Commonly, programs are loaded into memory 374 from at least one of the storage devices 378 with or without accompanying data.

Input devices such as a keyboard 380 and/or pointing device (mouse) 382, or the like, allow the user to provide commands to the computer 370. A monitor 384 or other type of output device is further connected to the system bus 376 via a suitable interface and provides feedback to the user. If the monitor 384 is a touch screen, the pointing device 382 can be incorporated therewith. The monitor 384 and typically an input pointing device 382 such as mouse together with corresponding software drivers form a graphical user interface (GUI) 386 for computer 370. Interfaces 388 on each of the system controller 60 allow communication between system controller 160 elements of the positioning system such as a separate controller used to provide command signals that for drive elements (motor controllers, servo valves, etc.) of the positioning system 11 to cause manipulation thereof. Interfaces 88 can also represent circuitry used to send signals to or receive signals to such controller(s) or directly to the actuators and/or sensing devices (e.g. contact sensors to measure the reference positions and remote positions, pressure sensors, etc.) as mentioned above. Commonly, such circuitry comprises digital-to-analog (D/A) and analog-to-digital (A/D) converters as is well known in the art. In another computing environment, the system controller 160 and each of the various other controllers are each a single board computer operable on a network bus of another computer, such as a supervisory computer. The schematic diagram of FIG. 21 is intended to generally represent these and other suitable computing environments.

Although the subject matter has been described in a language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. A system for supporting a workpiece, the system comprising: a holding assembly comprising a plurality of support assemblies, each support assembly comprising a head adapted to support a portion of the workpiece, each head being movable from a reference position to a position remote from the reference position; and a controller configured to access a model of the holding assembly having at least some of the support assemblies and a model of the workpiece to be supported by the holding assembly, wherein the controller is configured to ascertain a positional error associated with each support assembly, the positional error being based on a difference from a presumed remote position of the head when the head is moved from the reference position and an actual remote position when the head is moved from the reference position, and wherein the controller is configured to ascertain a desired position of each head of each of said at least some of the support assemblies based on the model of the holding assembly and the model of the workpiece to be supported and based on the positional error associated with the support assembly, the controller being configured to provide output signals related to the desired positions of the heads.

2. The system of claim 1 and further comprising a positioning assembly configured to adjust a position of each head based on the output signals from the controller.

3. The system of claim 2 wherein the positioning assembly is configured to engage and manipulate the position of the head.

4. The system of claim 2 wherein the positioning assembly is configured to engage and manipulate the head in multiple degrees of freedom.

5. The system of claim 1 wherein the controller is configured to ascertain a vector that is normal to an outer surface of the workpiece for each support assembly based on the corresponding positional error and use each associated vector to obtain each corresponding desired position.

6. The system of claim 5 wherein each support assembly includes a support rod arranged to provide support for a corresponding head.

7. The system of claim 6 wherein the head is configured to tilt with respect to a longitudinal axis of the support rod, and wherein the controller is configured to use the positional error to adjust a tilt of the head with respect to the longitudinal axis of the support rod.

8. The system of claim 7 wherein the head is configured to rotate with respect to a longitudinal axis of the support rod, and wherein the controller is configured to use the positional error to adjust the rotation of the head with respect to the longitudinal axis of the support rod.

9. The system of claim 8 wherein the support rods of at least some of the support assemblies are fixedly coupled to each respective head to move therewith.

10. A system for supporting a workpiece, the system comprising: a holding assembly comprising a plurality of support assemblies, each support assembly comprising a head adapted to support a portion of the workpiece, each head being movable from a reference position to a position remote from the reference position; and a controller configured to ascertain a positional error associated with each support assembly, the positional error being ascertained from a presumed remote position of the head when the head is moved from the reference position and an actual remote position when the head is moved from the reference position, the controller being further configured to use the positional error to adjust a desired position of each respective head in order to support the portion of the workpiece, each desired position being different than any of the reference position, presumed remote position or actual remote position associated with the support assembly.

11. The system of claim 10 wherein the controller is configured to ascertain a vector that is normal to an outer surface of the workpiece for each support assembly based on the corresponding positional error.

12. The system of claim 10 wherein each support assembly includes a support rod arranged to provide support for corresponding head.

13. The system of claim 12 wherein the head is configured to tilt with respect to a longitudinal axis of the support rod, and wherein the controller is configured to use the positional error to adjust a tilt of the head with respect to the longitudinal axis of the support rod.

14. The system of claim 13 wherein the head is configured to rotate with respect to a longitudinal axis of the support rod, and wherein the controller is configured to use the positional error to adjust the rotation of the head with respect to the longitudinal axis of the support rod.

15. The system of claim 14 wherein the support rods of at least some of the support assemblies are fixedly coupled to each respective head to move therewith.

16. The system of claim 15 wherein the controller is configured to access a model of the holding assembly having at least some of the support assemblies and a model of the workpiece to be supported by the holding assembly, wherein the controller is configured ascertain the desired position of each head of each of said at least some of the support assemblies based on the model of the holding assembly and the model of the workpiece to be supported.

17. The system of claim 16 wherein the controller is configured to ascertain a vector that is normal to an outer surface of the workpiece for each support assembly based on the corresponding positional error.

18. The system of claim 17 wherein each support assembly includes a support rod arranged to provide support for corresponding head.

19. The system of claim 18 wherein the head is configured to tilt with respect to a longitudinal axis of the support rod, and wherein the controller is configured to use the positional error to adjust a tilt of the head with respect to the longitudinal axis of the support rod.

20. The system of claim 19 wherein the head is configured to rotate with respect to a longitudinal axis of the support rod, and wherein the controller is configured to use the positional error to adjust the rotation of the head with respect to the longitudinal axis of the support rod.

21. The system of claim 20 wherein the support rods of at least some of the support assemblies are fixedly coupled to each respective head to move therewith.

22. The system of claim 16 and further comprising a positioning system adapted to engage each of the support assemblies to move each corresponding head, the positioning system being coupled to the controller to receive command signals from controller to selectively move each head of each support assembly.

23. The system of claim 22 wherein the controller is configured to use the positioning system to ascertain the reference position and the actual remote position remote from the reference position for each corresponding support assembly.

* * * * *